US009653918B2

(12) United States Patent
Mort et al.

(10) Patent No.: US 9,653,918 B2
(45) Date of Patent: May 16, 2017

(54) AUTONOMOUS THERMAL EVENT CONTROL AND MONITORING SYSTEM FOR A NETWORK VAULT

(71) Applicant: EATON CORPORATION, Cleveland, OH (US)

(72) Inventors: Deborah Kaltwasser Mort, Coraopolis, PA (US); Mark A. Faulkner, Greenwood, SC (US)

(73) Assignee: EATON CORPORATION, Cleveland, OH (US)

( * ) Notice: Subject to any disclaimer, the term of this patent is extended or adjusted under 35 U.S.C. 154(b) by 900 days.

(21) Appl. No.: 13/804,860

(22) Filed: Mar. 14, 2013

(65) Prior Publication Data
US 2014/0277799 A1    Sep. 18, 2014

(51) Int. Cl.
*H02J 3/00* (2006.01)
(52) U.S. Cl.
CPC ...................................... *H02J 3/00* (2013.01)
(58) Field of Classification Search
None
See application file for complete search history.

(56) References Cited

U.S. PATENT DOCUMENTS

| | | | |
|---|---|---|---|
| 3,947,728 A | 3/1976 | Smith | |
| 4,799,126 A * | 1/1989 | Kruse | H02H 3/087 361/101 |
| 5,428,494 A * | 6/1995 | Ahuja | H02H 3/06 361/62 |
| 5,586,156 A * | 12/1996 | Gaubatz | G21C 17/00 376/216 |
| 5,621,776 A * | 4/1997 | Gaubatz | G21C 17/00 376/215 |
| 5,822,165 A | 10/1998 | Moran | |
| 5,844,781 A | 12/1998 | Schlotterer et al. | |
| 6,504,693 B1 | 1/2003 | Moffat et al. | |
| 7,209,804 B2 * | 4/2007 | Curt | G01R 19/2513 700/286 |

(Continued)

OTHER PUBLICATIONS

Courchesne, P., "Underground Distribution Vaults with Environmental Controls", 2000, IEEE.*

(Continued)

*Primary Examiner* — Mohammad Ali
*Assistant Examiner* — Kelvin Booker
(74) *Attorney, Agent, or Firm* — Eckert Seamans; Philip Levy

(57) ABSTRACT

An autonomous thermal event control and monitoring system includes a processor component having an enclosure, a processor within the enclosure, a routine, a number of inputs from the processor, and a plurality of inputs to and a plurality of outputs from the processor for each of a plurality of feeders. The system also includes a human machine interface communicating with the processor. The inputs include for each of the feeders, a first input for a thermal sensor and a second input for a status of a network protector, a plurality of third inputs for statuses of a medium voltage interrupter, and a fourth input for a sudden pressure sensor of a network transformer. The outputs include for each of the feeders, a first output for a command to the network protector, and a plurality of second outputs for commands to the medium voltage interrupter.

15 Claims, 19 Drawing Sheets

(56) References Cited

U.S. PATENT DOCUMENTS

| | | | | |
|---|---|---|---|---|
| 7,881,907 | B2* | 2/2011 | Curt | H02J 13/0075 700/286 |
| 8,981,954 | B2* | 3/2015 | Kumfer | H02H 5/12 361/62 |
| 2005/0007042 | A1* | 1/2005 | Moore | A01B 45/02 318/139 |
| 2005/0132241 | A1* | 6/2005 | Curt | G01R 19/2513 713/300 |
| 2005/0135032 | A1* | 6/2005 | Faulkner | H02H 11/007 361/90 |
| 2005/0235174 | A1* | 10/2005 | Curt | G05B 23/0224 713/340 |
| 2005/0273183 | A1* | 12/2005 | Curt | H02J 13/0006 700/286 |
| 2006/0165023 | A1* | 7/2006 | Faulkner | H02H 3/04 370/310 |
| 2007/0229295 | A1* | 10/2007 | Curt | H02H 3/042 340/653 |
| 2007/0249319 | A1* | 10/2007 | Faulkner | H04L 1/22 455/402 |
| 2009/0027061 | A1* | 1/2009 | Curt | H02J 13/0055 324/539 |
| 2010/0142108 | A1* | 6/2010 | Faulkner | H02B 7/06 361/62 |
| 2010/0201514 | A1* | 8/2010 | Barna | H02J 13/0079 340/539.22 |
| 2010/0223018 | A1* | 9/2010 | DeLeo | H02J 13/002 702/64 |
| 2013/0060397 | A1* | 3/2013 | Hawkins | G06Q 10/0631 700/296 |
| 2013/0257452 | A1* | 10/2013 | DeLeo | G01R 31/02 324/555 |
| 2014/0100702 | A1* | 4/2014 | Schweitzer, III | G05B 13/02 700/286 |
| 2015/0094968 | A1* | 4/2015 | Jia | G06Q 40/04 702/60 |

OTHER PUBLICATIONS

Gouvea, M.R.; Robba, E.J.; Belvedere, E.C.; Moreira, J.R.S. and Brunheroto, P.A., "Thermal Simulation for Distribution Transformers in Underground Vaults", 2004, IEEE/PES Transmission and Distribution Conference and Exposition: Latin America.*

Penton Business Media, Inc., EC&M Electrical Construction & Maintenance, "VaultGard", http://ecmweb.com/print/content/vaultgard, Jan. 1, 2010, 1 p.

Eaton Corporation, "VaultGard™ Gateway", Product Information, 2009, 2 pp.

Eaton Corporation, "VaultGard™ Arc Reduction Maintenance System Indicating Diagnostic Module", Product Information, 2009, 2 pp.

Reliatronics Inc., "Modular RTU", Model: RTU3200, RTU3200 Documentation, Sep. 12, 2008, 61 pp.

Reliatronics Inc., "Reliatronics Inc. Model RTU3200", http://reliatronics.com/files/rtu3200.htm, 2013, 2 pp.

* cited by examiner

| SYSTEM | CFD STATUS | | | GROUND STATUS | |
|---|---|---|---|---|---|
| 1st & MAIN — 70 | INACTIVE — 72 | | | INACTIVE — 74 | |
| FEEDER | PRIMARY SWITCH /76 | NETWORK PROTECTOR | THERMAL SENSOR | | SUDDEN PRESSURE |
| | STATUS /78 | STATUS /80 | STATUS /82 | | STATUS /84 |
| FEEDER 1 | CLOSED | CLOSED | INACTIVE | | INACTIVE |
| 23456 | CLOSED | CLOSED | INACTIVE | | INACTIVE |
| F3333333 | CLOSED | CLOSED | INACTIVE | | INACTIVE |
| FEEDER 4 | CLOSED | CLOSED | INACTIVE | | INACTIVE |
| FEEDER 5 | CLOSED | CLOSED | INACTIVE | | INACTIVE |
| FEEDER 6 | CLOSED | CLOSED | INACTIVE | | INACTIVE |

HOME / STATUS

60

PROTECTION ENABLED — 86

MENU — 88

FIG. 2A

SYSTEM

MAINTENANCE

1st & MAIN — 70

| FEEDER | PRIMARY SWITCH STATUS 78 | NETWORK PROTECTOR STATUS 80 | PRIMARY SWITCH TRIP 92 | PRIMARY SWITCH RESET 94 | PRIMARY SWITCH CLOSE 96 | NETWORK PROTECTOR LOCKOPEN 98 | NETWORK PROTECTOR CLEAR 100 |
|---|---|---|---|---|---|---|---|
| FEEDER 1 — 76 | CLOSED | CLOSED | TRIP MVI1 | RESET MVI1 | CLOSE MVI1 | LOCKOPEN NP1 | CLEAR NP1 |
| 23456 | CLOSED | CLOSED | TRIP MVI2 | RESET MVI2 | CLOSE MVI2 | LOCKOPEN NP2 | CLEAR NP2 |
| F3333333 | CLOSED | CLOSED | TRIP MVI3 | RESET MVI3 | CLOSE MVI3 | LOCKOPEN NP3 | CLEAR NP3 |
| FEEDER 4 | CLOSED | CLOSED | TRIP MVI4 | RESET MVI4 | CLOSE MVI4 | LOCKOPEN NP4 | CLEAR NP4 |
| FEEDER 5 | CLOSED | CLOSED | TRIP MVI5 | RESET MVI5 | CLOSE MVI5 | LOCKOPEN NP5 | CLEAR NP5 |
| FEEDER 6 | CLOSED | CLOSED | TRIP MVI6 | RESET MVI6 | CLOSE MVI6 | LOCKOPEN NP6 | CLEAR NP6 |

PROTECTION ENABLED — 86

MENU — 88

*FIG. 2B*

| SYSTEM | CFD STATUS | | GROUND STATUS | |
|---|---|---|---|---|
| 1st & MAIN — 70 | RESET CFD — 102 | INACTIVE — 72 | RESET GROUND — 104 | INACTIVE — 74 |

| FEEDER | PRIMARY SWITCH | NETWORK PROTECTOR | THERMAL SENSOR | SUDDEN PRESSURE |
|---|---|---|---|---|
| 76 | STATUS — 78 | STATUS — 80  106 RESET | 82 STATUS  108 RESET | STATUS — 84 |
| FEEDER 1 | CLOSED | CLOSED | RESET THERMAL 1 | INACTIVE | RESET SP 1 | INACTIVE |
| 23456 | CLOSED | CLOSED | RESET THERMAL 2 | INACTIVE | RESET SP 2 | INACTIVE |
| F3333333 | CLOSED | CLOSED | RESET THERMAL 3 | INACTIVE | RESET SP 3 | INACTIVE |
| FEEDER 4 | CLOSED | CLOSED | RESET THERMAL 4 | INACTIVE | RESET SP 4 | INACTIVE |
| FEEDER 5 | CLOSED | CLOSED | RESET THERMAL 5 | INACTIVE | RESET SP 5 | INACTIVE |
| FEEDER 6 | CLOSED | CLOSED | RESET THERMAL 6 | INACTIVE | RESET SP 6 | INACTIVE |

SENSOR RESET

PROTECTION ENABLED — 86

MENU — 88

SENSOR CONFIG / TEST — 68

| SYSTEM | | CFD STATUS | | GROUND STATUS | |
|---|---|---|---|---|---|
| 1st & MAIN — 70 | ENABLE / DISABLE CFD — 122 | INACTIVE — 72 | ENABLE / DISABLE GROUND — 124 | INACTIVE — 74 | |

| FEEDER | PRIMARY SWITCH | | NETWORK PROTECTOR | | THERMAL SENSORS | | | SUDDEN PRESSURE SENSORS | | |
|---|---|---|---|---|---|---|---|---|---|---|
| — 76 | STATUS — 78 | | STATUS — 80 | | ENABLE / DISABLE — 126 | STATUS — 82 | | ENABLE / DISABLE — 128 | STATUS — 84 | |
| FEEDER 1 | CLOSED | | CLOSED | | ENABLE THERMAL 1 | INACTIVE | | ENABLE SP 1 | INACTIVE | |
| 23456 | CLOSED | | CLOSED | | ENABLE THERMAL 2 | INACTIVE | | ENABLE SP 2 | INACTIVE | |
| F3333333 | CLOSED | | CLOSED | | ENABLE THERMAL 3 | INACTIVE | | ENABLE SP 3 | INACTIVE | |
| FEEDER 4 | CLOSED | | CLOSED | | ENABLE THERMAL 4 | INACTIVE | | ENABLE SP 4 | INACTIVE | |
| FEEDER 5 | CLOSED | | CLOSED | | ENABLE THERMAL 5 | INACTIVE | | ENABLE SP 5 | INACTIVE | |
| FEEDER 6 | CLOSED | | CLOSED | | ENABLE THERMAL 6 | INACTIVE | | ENABLE SP 6 | INACTIVE | |

PROTECTION ENABLED — 86

MENU — 88

*FIG. 2E*

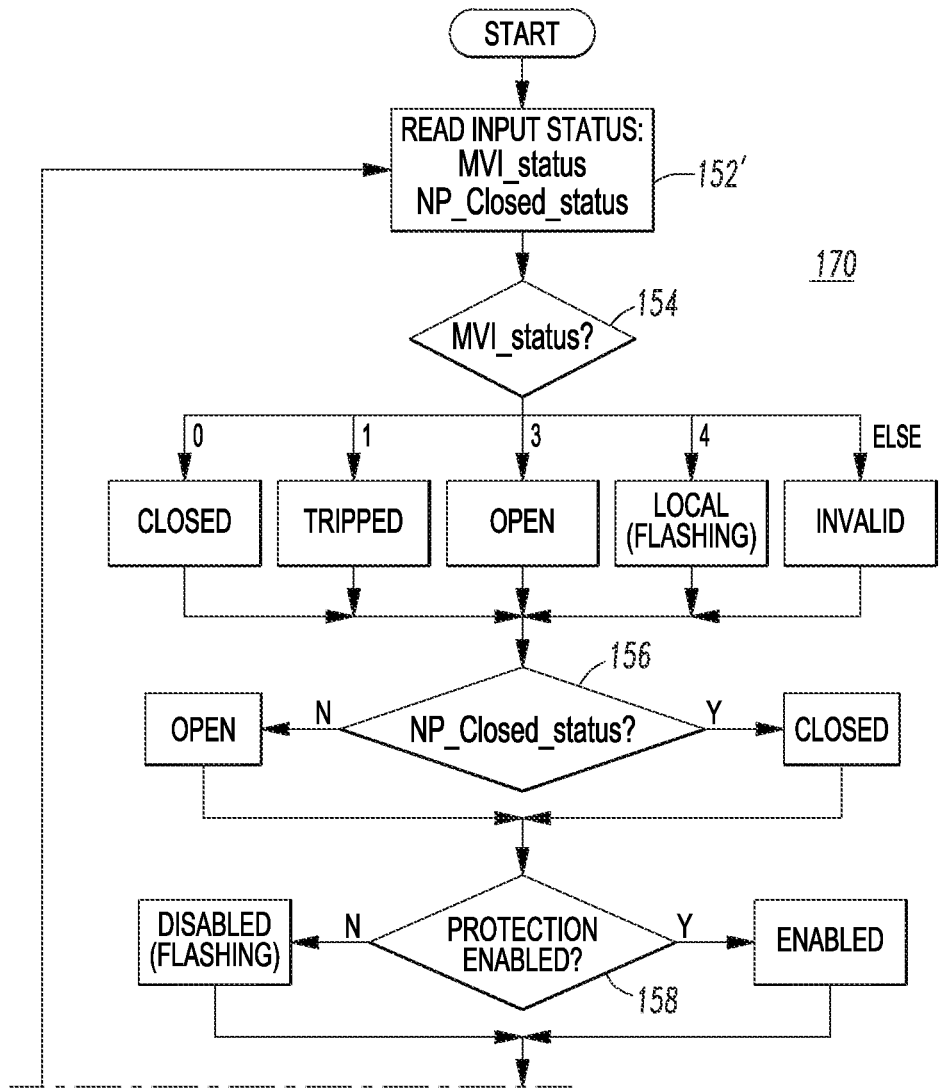
FIG.3B1

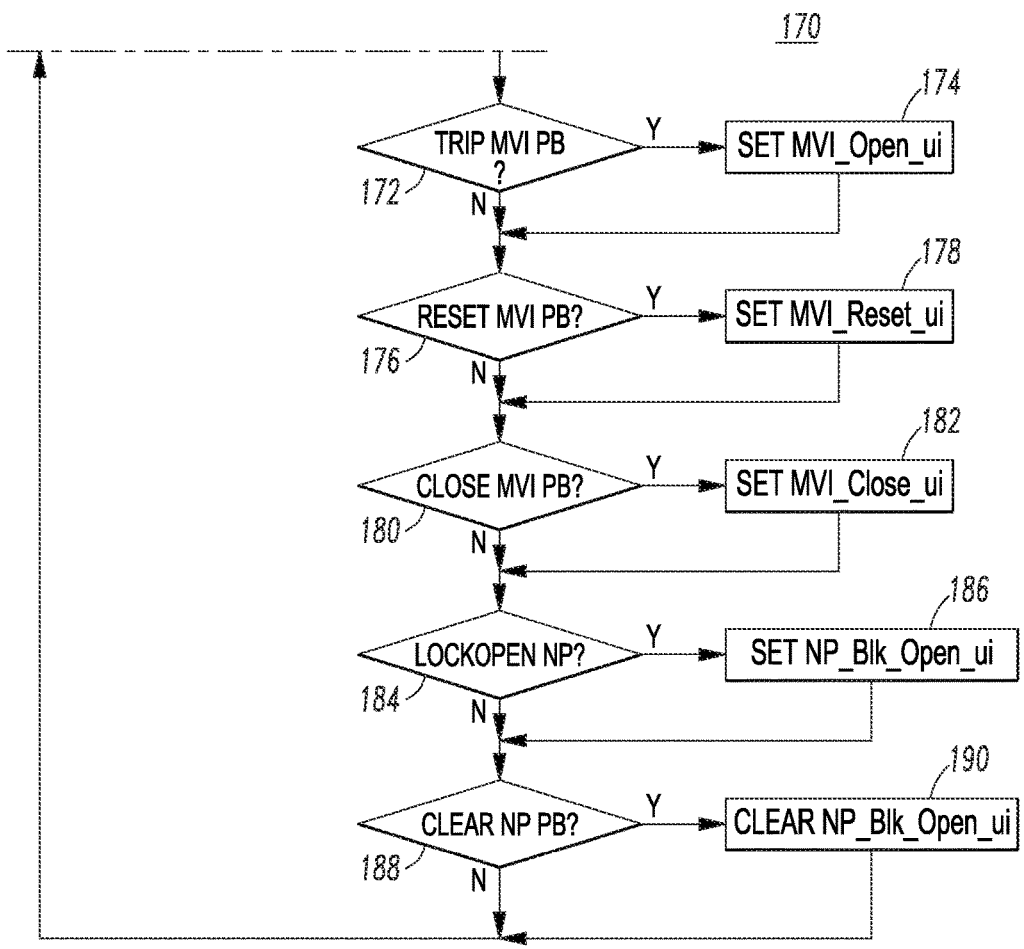
FIG.3B2

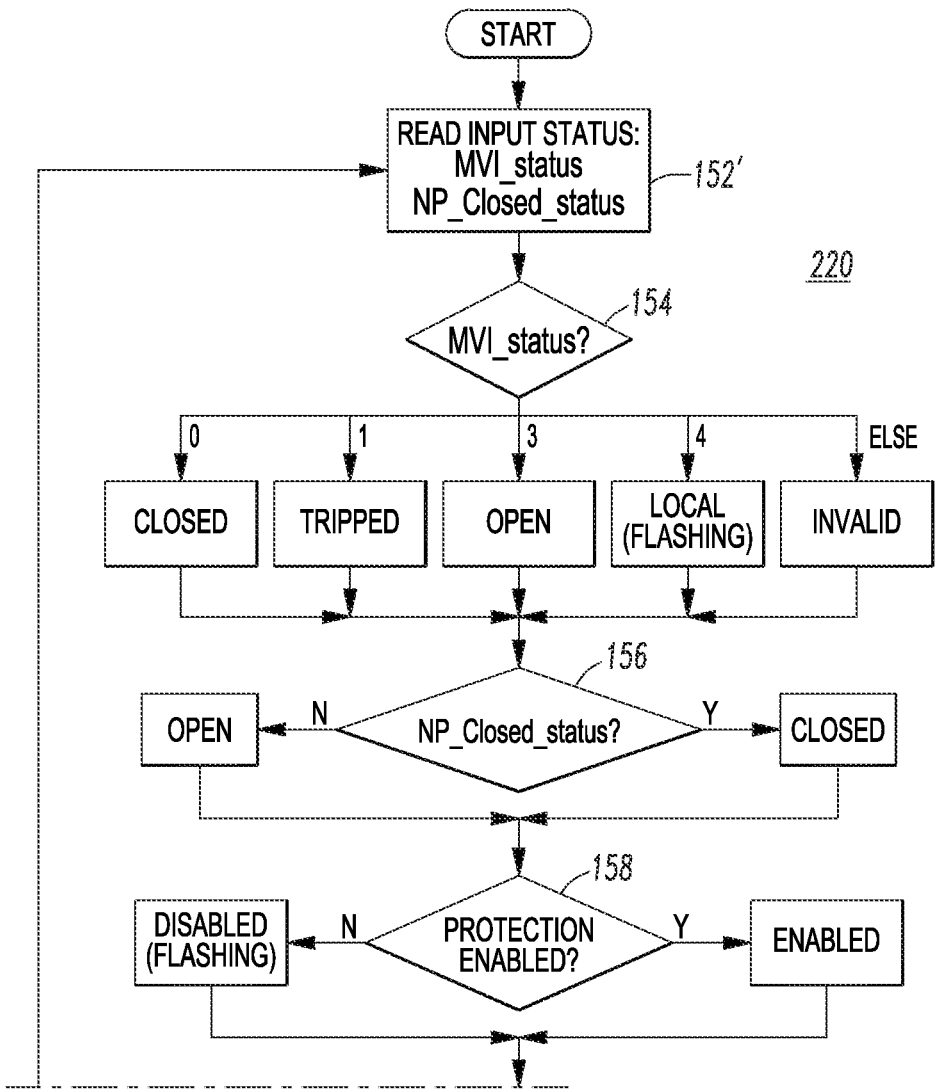
FIG.3D1

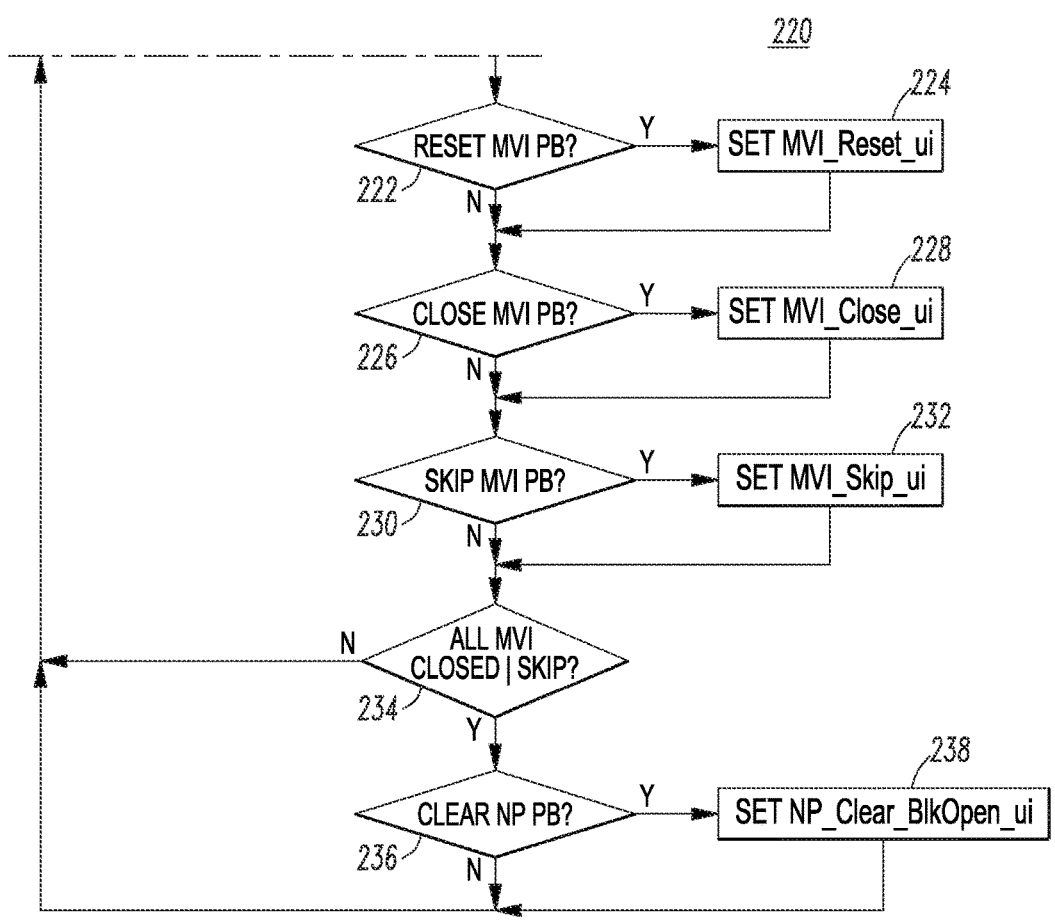
FIG.3D2

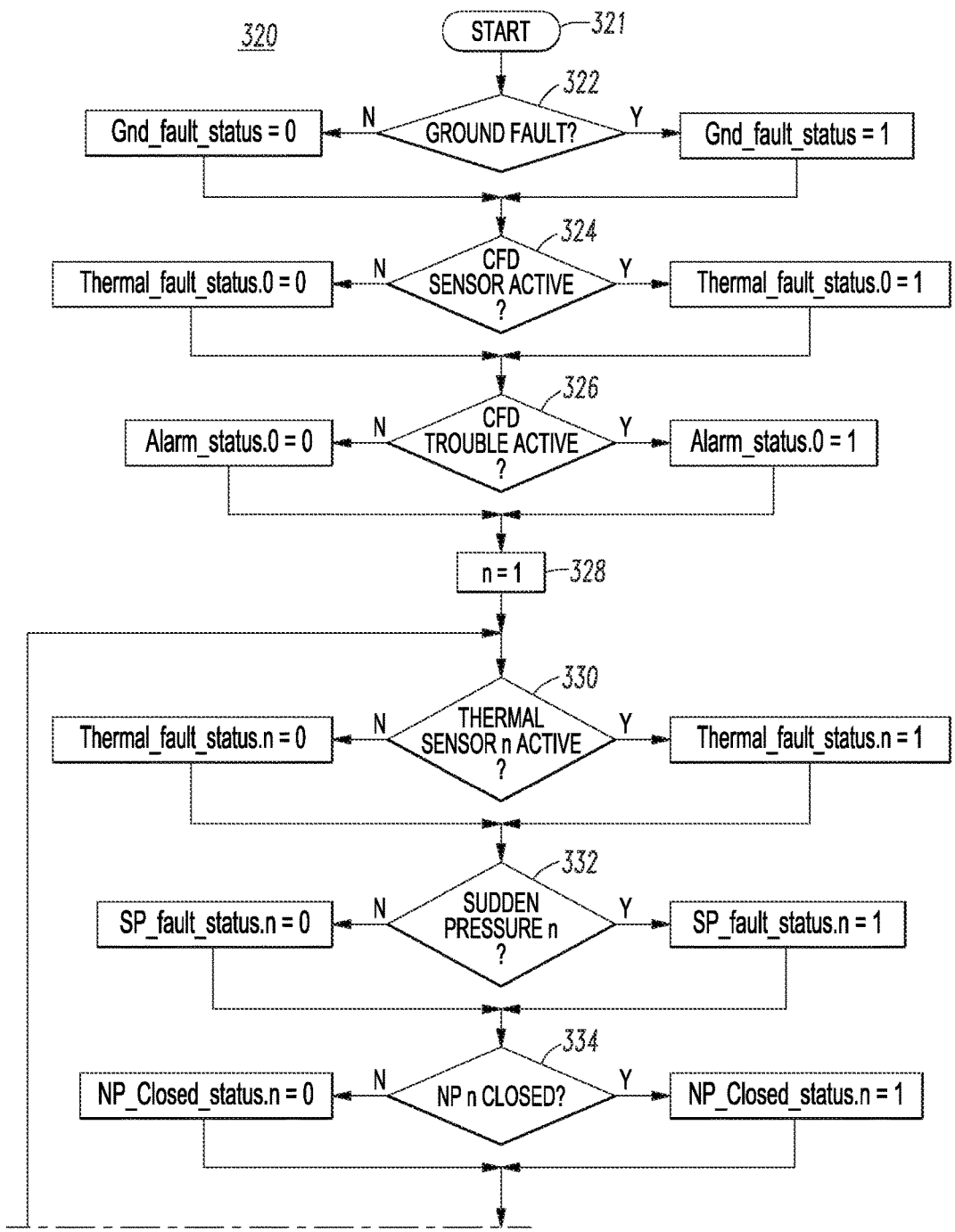
FIG.5A1

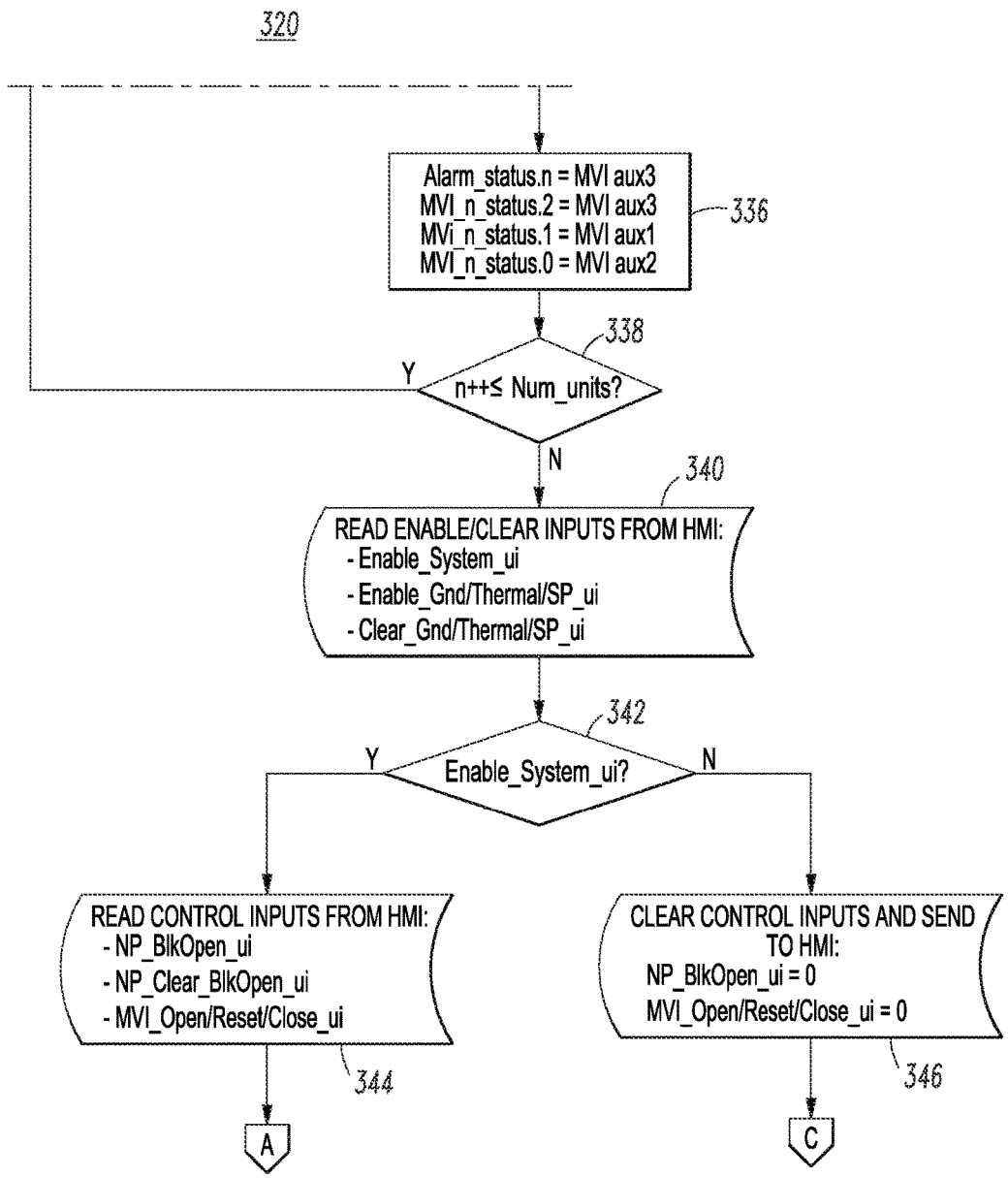
FIG.5A2

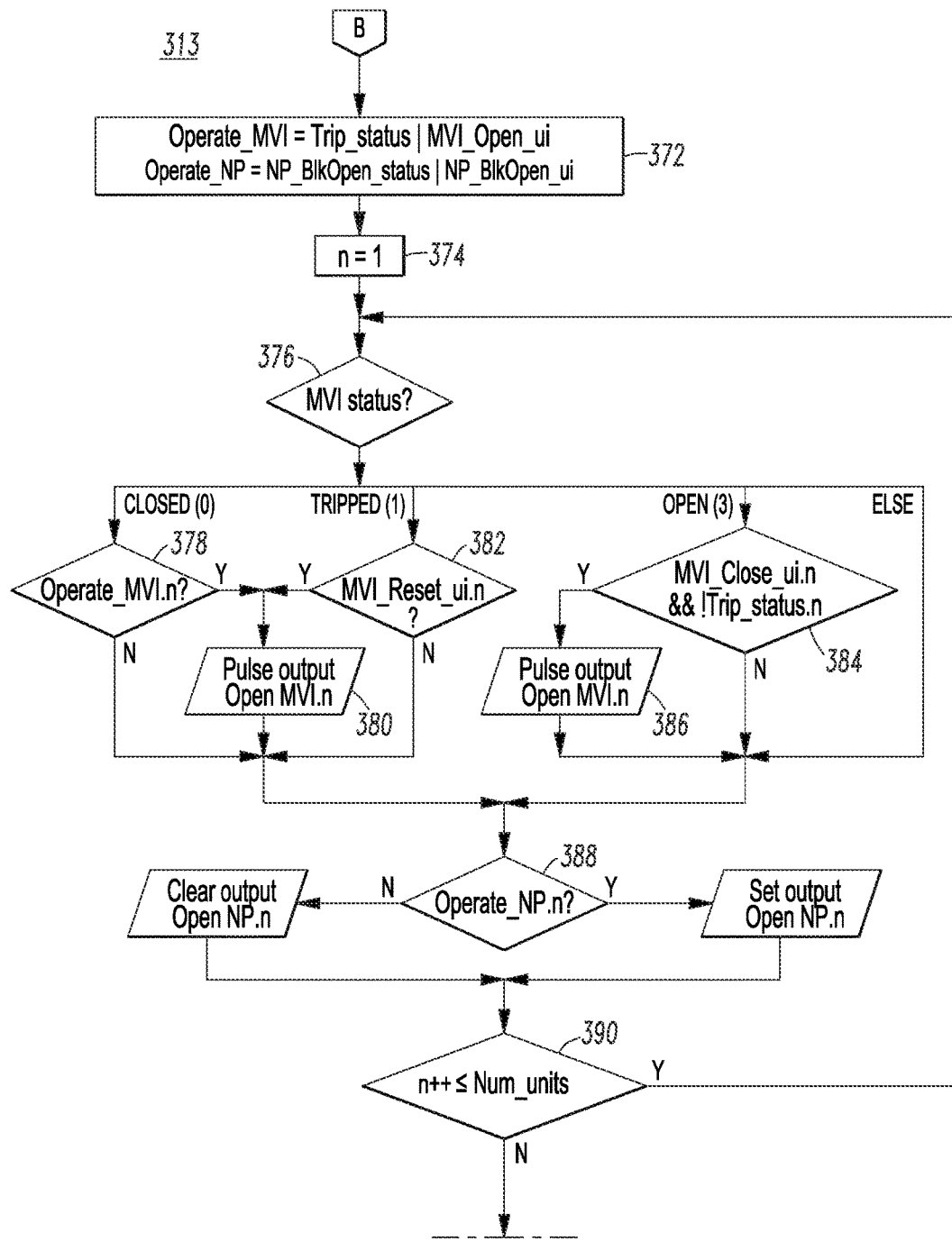
FIG.5C1

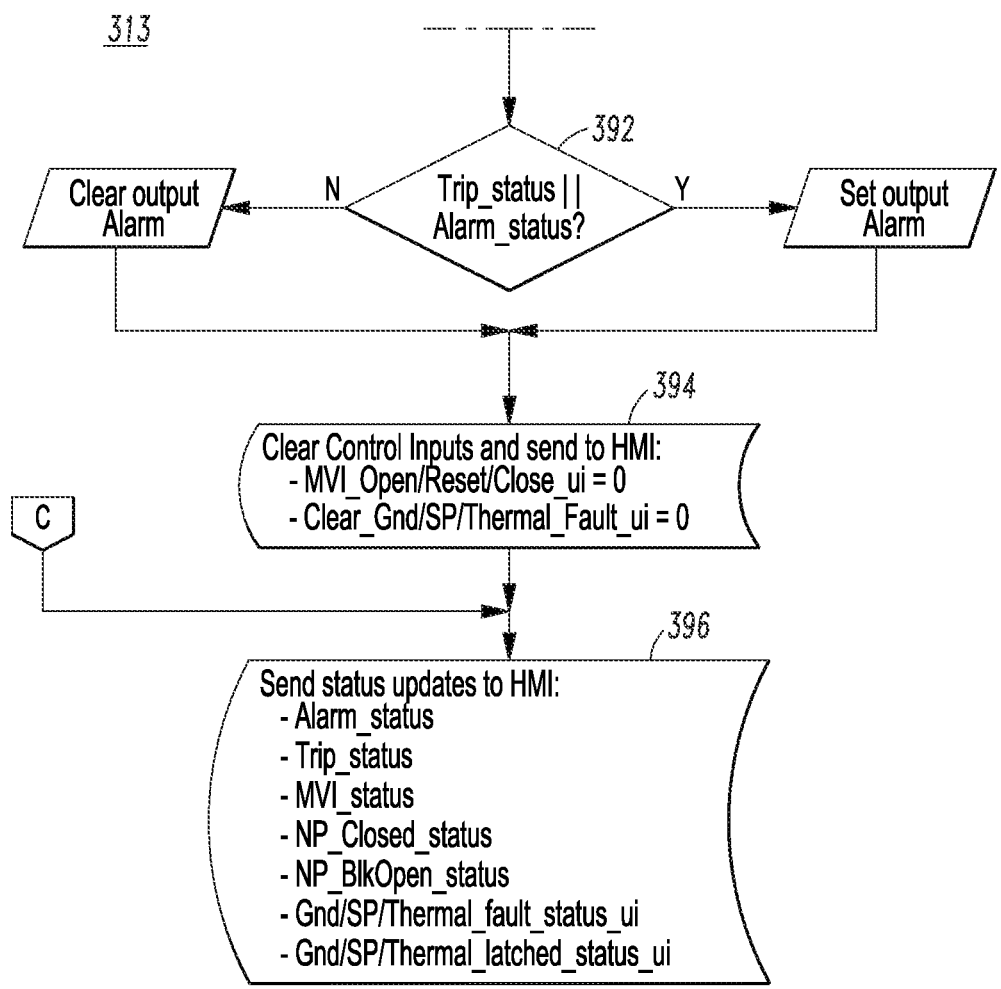
FIG.5C2

AUTONOMOUS THERMAL EVENT CONTROL AND MONITORING SYSTEM FOR A NETWORK VAULT

BACKGROUND

Field

The disclosed concept pertains generally to systems for a network vault including a plurality of medium voltage feeders that form a network bus and, more particularly, to thermal control and monitoring systems for network vaults.

Background Information

Low voltage secondary power distribution networks consist of interlaced loops or grids supplied by two or more sources of power, in order that the loss of any one source will not result in an interruption of power. Such networks provide the highest possible level of reliability with conventional power distribution and are, normally, used to supply high-density load areas, such as a section of a city, a large building or an industrial site.

Each source supplying the network is typically a medium voltage feeder including a switch, a voltage reducing transformer and a network protector. As is well-known, a network protector is an apparatus used to control the flow of electrical power to a distribution network. The network protector includes a low voltage circuit breaker and a control relay which opens the circuit to the transformer upon detection of abnormal current flow. Specifically, the control relay typically senses the network voltages, the line currents and the phasing voltage, and executes algorithms to initiate circuit breaker tripping or re-closing actions. Trip determination is based on detecting reverse power flow, that is, power flow from the network to the primary feeder. Examples of network protector relays are disclosed in U.S. Pat. Nos. 3,947,728; 5,822,165; 5,844,781; and 6,504,693, which are incorporated by reference herein.

A network system is a redundant power delivery system including a plurality of primary feeders and associated network protectors. The transformer secondaries are electrically tied together through the network protector circuit breakers to a network bus, which increases the available fault current. However, as a result, workers can be exposed to arc flash hazards, which can cause equipment damage, serious bodily injury or even death if done improperly. A worker performing network protector manipulation is in physical proximity with the network protector. Therefore, the workers are typically required to wear approved personal protection equipment (PPE) to resist serious injury or death that could result if an electrical failure were to occur during racking/draw-out/draw-in operations.

Network protectors are typically used in the enclosed spaces of underground vaults. Since about 1922, network protectors have been installed in underground concrete vaults in major city centers. Since that time, such network protectors were designed as a switch that was bolted in place and required manual removal from a corresponding enclosure. The relatively extreme environment of a network protector demanded special components. As a result, standard power circuit breakers were not utilized. In about 1999, the assignee of the disclosed concept developed a network protector with a power circuit breaker suitable for that environment.

A known fire and ground fault protection system for a network vault includes a ground fault relay, a continuous fire detection (CFD) control board and indicators, and lockout relays for transformers and network protectors, including power supplies. An operator panel for this system includes indicator lights and trip/close pushbutton controls for the transformers and the network protectors. However, this system must be custom-wired when each transformer/network protector pair is added to the system. Hence, installation is both expensive and error prone. Also, no automated testing of every connection point is available from the operator panel. For example, known systems are implemented using discrete lights and switches for showing status, clearing faults, and operating switches and network protectors. However, safety interlocks to prevent system operation during testing are not incorporated.

There is room for improvement in thermal control and monitoring systems for network vaults.

SUMMARY

These needs and others are met by embodiments of the disclosed concept in which an autonomous thermal event control and monitoring system is for a number of network vaults including a plurality of medium voltage feeders forming a network bus, each of the feeders including a network protector having a thermal sensor, outputting a status and inputting a command, a network transformer having a sudden pressure sensor, and a medium voltage interrupter outputting a plurality of statuses and inputting a plurality of commands. The system comprises: a processor component comprising an enclosure, a processor within the enclosure and including a routine, a number of inputs to the processor, a number of outputs from the processor, and a plurality of inputs to and a plurality of outputs from the processor for each of the feeders; and a human machine interface communicating with the processor, wherein the plurality of inputs include for each of the feeders, a first input for the thermal sensor and a second input for the status of the network protector, a plurality of third inputs for the statuses of the medium voltage interrupter, and a fourth input for the sudden pressure sensor of the network transformer, and wherein the plurality of outputs include for each of the feeders, a first output for the command to the network protector, and a plurality of second outputs for the commands to the medium voltage interrupter.

BRIEF DESCRIPTION OF THE DRAWINGS

A full understanding of the disclosed concept can be gained from the following description of the preferred embodiments when read in conjunction with the accompanying drawings in which:

FIGS. 2A-2E are display diagrams of home/status, maintenance, sensor reset, protection, and sensor configuration/test screens of the human machine interface (HMI) of FIG. 1.

FIGS. 3A, 3B1-3B2, 3C, 3D1-3D2 and 3E are flowcharts of HMI routines for the home/status, maintenance, sensor reset, protection, and sensor configuration/test screens of FIGS. 2A-2E, respectively.

FIGS. 5A1-5A2, 5B and 5C1-5C2 are flowcharts of read inputs, check for trip, and control outputs routines, respectively, of the routine of FIG. 4.

DESCRIPTION OF THE PREFERRED EMBODIMENTS

Figure 1:
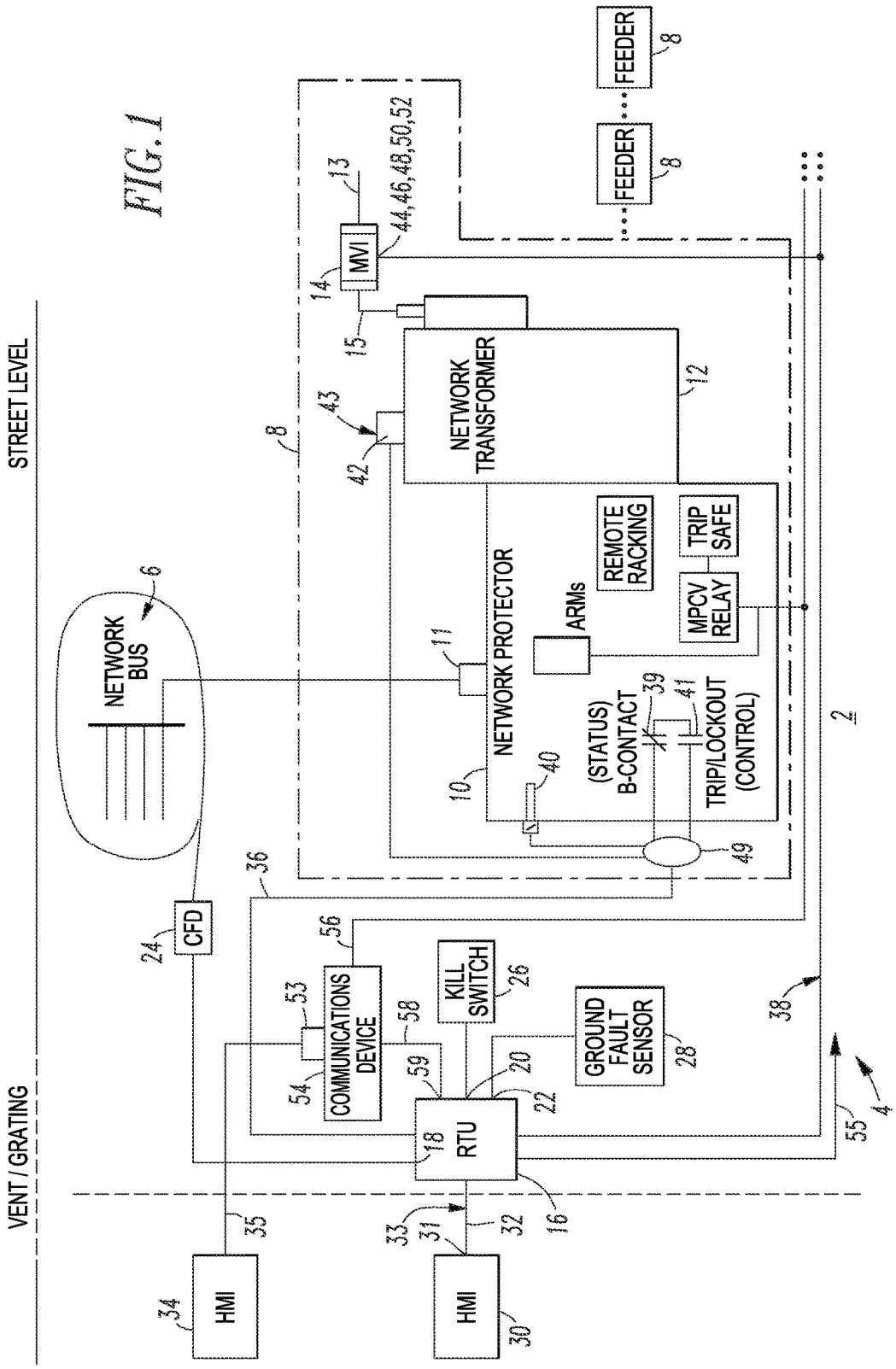
FIG. 1 is a schematic diagram in block form of a thermal event system in accordance with embodiments of the disclosed concept.

As employed herein, the term "number" shall mean one or an integer greater than one (i.e., a plurality).

As employed herein, the term "processor" shall mean a programmable analog and/or digital device that can store, retrieve, and process data; a computer; a controller; a remote terminal unit; a workstation; a personal computer; a microprocessor; a microcontroller; a microcomputer; a central processing unit; a mainframe computer; a mini-computer; a server; a networked processor; or any suitable processing device or apparatus.

As employed herein, the statement that two or more parts are "connected" or "coupled" together shall mean that the parts are joined together either directly or joined through one or more intermediate parts.

As employed herein, the term "low voltage" shall mean any voltage that is less than about 1000 $V_{RMS}$.

As employed herein, the term "medium voltage" shall mean any voltage greater than a low voltage and in the range from about 1000 $V_{RMS}$ to about 38 $kV_{RMS}$.

As employed herein, the term "autonomous" shall mean self-contained or complete in itself.

The disclosed concept is described in association with a network bus formed, for example, by two to six feeders in an underground network vault, although the disclosed concept is applicable to a wide range of network systems having any suitable plurality of feeders and any suitable count of network vaults, which can, for example and without limitation, be underground, above ground, or in a number of buildings.

The disclosed concept provides an autonomous thermal event control and monitoring system (or thermal event system) that provides monitoring and spot network/circuit isolation when a network vault or transformer overheats, when a sudden pressure fault occurs, or when a ground fault is detected. This provides significant improvements and time savings to installation, testing, and maintenance over known prior systems.

The disclosed thermal event system provides autonomous control and monitoring of thermal, transformer and/or ground fault events in a number of network vaults. Example sensor inputs include vault and network protector thermal sensors, transformer sudden pressure sensors and ground fault detection, although the system can readily be expanded to include additional sensors.

The system preferably includes an external human machine interface (HMI) (e.g., without limitation, a touch screen) that provides monitoring of all sensor inputs, medium voltage interrupters (MVIs) and network protectors (NPs) in a spot network. System configuration and remote operation of the MVIs and NPs for system reset and maintenance purposes are available through the HMI.

The system preferably includes provisions for disabling protection for the entire system or for each sensor individually for testing purposes. MVI and NP inputs/outputs are wired to a system controller, such as an example remote terminal unit, using predefined cables for each set of the MVIs and NPs, which simplifies system installation and provides a readily scalable system.

FIG. 1 shows an example thermal event system 2 for a number of underground network vaults 4 including a network bus 6 and a plurality of feeders 8, each of which includes a network protector (NP) 10, a network transformer (NT) 12 and a medium voltage interrupter (MVI) 14. For simplicity of illustration, only one feeder 8 is completely shown, it being understood that a plurality of feeders 8 (shown in block form) are provided. For example and without limitation, there can be one vault 4 for up to six feeders 8. Alternatively, each NT 12 of the various feeders 8 could be in adjacent vaults (not shown) in relatively close proximity to the vault 4.

The MVI 14 inputs a medium voltage (MV) input 13 and outputs the MV to the NT primary winding (not shown) at MV output 15. The low voltage output (not shown) of the NT secondary winding (not shown) is input by the circuit breaker (not shown) of the NP 10. The NP output 11 outputs to the network bus 6, which provides power to the secondary grid with the other NPs (not shown) of the other feeders 8.

The system 2 also includes a suitable processor, such as the example controller (e.g., a remote terminal unit (RTU) 16), which includes a number of digital inputs 18,20,22 for a number of a continuous fire detection (CFD) probe 24, a kill switch 26 and/or a number of ground fault sensors 28. For example and without limitation, one ground fault sensor 28 is directly electrically connected to the RTU 16 (e.g., using a dry normally open contact output). If any additional number of ground fault sensors (not shown) are employed, then their contacts (not shown) can be connected to additional inputs of the RTU 16 or be electrically connected in parallel with the output of the ground fault sensor 28. However, indication, clearing and testing can still be accomplished by a single indicator or pushbutton.

In this example, a number of general system inputs 18,20,22 to the RTU 16 may include a number of the following: (1) KILL (from the vault kill switch 26); (2) FWA (from the CFD probe 24 that detects a high thermal reading alarm in a number of different regions within the vault 4); and (3) FWT (a trouble signal from the CFD probe 24, meaning, for example, there may be a break in the CFD probe 24).

The system 2 further includes a number of human machine interfaces (HMIs). In the example embodiment, a touchscreen HMI 30 includes a wired or wireless communication interface 31 configured for communication over a suitable serial or other communication network, such as the example Modbus® network 32 of communication cable 33. Also, an optional wired or wireless HMI 34 (e.g., without limitation, a smart phone; an iPad® device or personal computer including a suitable web browser) communicates with an optional VaultGard® communications device 54 via Ethernet 35, IEEE 802.11 (Wi-Fi) (not shown), or cellular or custom radio (not shown). The HMI 34 can have the same or similar functionality as the HMI 30, which will be described.

The RTU 16 interfaces to the NP 10, the NT 12 and the MVI 14 of each of the feeders 8 by two cables 36 and 38. The cable 36 includes digital I/O signals for the NP "b-contact" or "52b" contact 39 from the NP 10, a thermal probe 40 from the NP 10, a trip-lockout command 41 output to the NP 10, and an input 42 from the transformer sudden pressure relay (sensor) 43. The cable 38 includes "Aux1", "Aux2" and "Aux3" signals 44,46,48 from the MVI 14, a trip command 50 to the MVI 14, and a close command 52 to the MVI 14.

The system 2 may optionally include the VaultGard® communications device 54 for reporting system status, alarms, and e-mail alerts from the NP 10 and other I/O devices (not shown) of each of the feeders 8. Communications with a computer, phone, or tablet outside the vault 4, such as the example HMI 34, is through a web server (not shown) of the communications device 54 over Ethernet 35. Wireless communications with the communications device 54 employ an additional radio or wireless router (not shown) connected to Ethernet port 53. On the field bus side, which has a communication network 56, such as, for example and without limitation, INCOM or DNP3, the communications device 54 communicates with the various NP relays (shown as MPCV relay), transformer monitoring devices (not shown), RTUs (not shown), and additional I/O devices (not shown). The RTU 16 provides the thermal event system 2 with the various input/output connections. The RTU 16 communicates with the HMI 30 via the communication network 32 (e.g., Modbus®) and communicates to the communications device 54 via the communication network 58 using DNP3 through serial port 59. Status, alarms, logging and e-mail alerts are communicated to a user at the HMI 34 by the communications device 54.

A number of general system outputs 55 from the RTU 16 may include a number of the following: (1) SYS-AL (system alarm); (2) DIS-AL (system disabled alarm); (3) TR-AL (trip alarm); (4) CFD-TR (CFD trouble alarm); and (5) MV-LOC (the MVI 14 is in local alarm).

The RTU 16 inputs three specific inputs and outputs one specific output for the NP 10/NT 12 pair through bulkhead junction box 49 of each of the feeders 8 including: (1) N_b (the "b-contact" or "52b" contact 39 from the NP 10, which indicates the open-close status of the NP circuit breaker (not shown) (i.e., when the circuit breaker is open, the b-contact 39 is closed); (2) N_TH (from the thermal sensor 40 that is monitoring the temperature of the NP 10); (3) T_SP 42 (from the rapid pressure rise relay or the sudden pressure NT relay 43); and (4) N_TL (the trip-lockout command 41 to the NP 10).

The RTU 16 inputs three specific inputs and outputs two specific outputs for the MVI 14 of each of the feeders 8 including: (1) M_A1 44 (the "Aux1" signal from the MVI 14); (2) M_A2 46 (the "Aux2" signal from the MVI 14); (3) M_A3 48 (the "Aux3" signal from the MVI 14); (4) M_TR 50 (the trip command to the MVI 14); and (5) M_CL 52 (the close command to the MVI 14). M_A1 44, M_A2 46 and M_A3 48 provide the closed/tripped/open/local status of the MVI 14, wherein the three bits defined by M_A3, M_A1 and M_A2 report four states: 000=0=closed, 001=1=tripped, 011=3=open, and 1xx=4=local, with "x" being "don't care" (i.e., "0" or "1").

The kill switch 26, the CFD sensor 24 and the ground fault sensor 28 can each result in tripping the NP 10 and the MVI 14 of all of the feeders 8 of the system 2. The NP thermal sensor 40 and the NT sudden pressure relay 43 function to isolate the corresponding feeder 8. These operate and trip the MVI 14 and block open the NP 10 for a single feeder 8.

The RTU 16 and the HMIs 30 and/or 34 latch sensor operation until reset from the HMI. The MVI 14 is prevented from reclosing while the (latched) trip condition is active. After the latched sensor operation is cleared, the system 2 clears the MVI 14 and moves to open using one of the HMIs, closes the MVI 14 using one of the HMIs, and makes sure that the MVI 14 of each feeder 8 is closed or that skip is active, and then releases "BlkOpen" to the NP 10 of each feeder 8.

The RTU 16 and the optional communications device 54 can be powered, for example, by a +24 VDC power supply (not shown) with a suitable battery backup.

FIGS. 2A-2E show display diagrams of respective home/status, maintenance, sensor reset, protection, and sensor configuration/test screens 60,62,64,66,68 of the HMI 30 of FIG. 1. The home/status screen 60 of FIG. 2A displays the name 70 of the system 2 (FIG. 1), the status 72 (e.g., inactive; active) of the CFD sensor 24, the status 74 (e.g., inactive; active) of the ground fault sensor 28, the names 76 of the example feeders 8, the status 78 (e.g., closed; tripped, open; local) of the MVI 14 of each of the feeders 8, the status 80 (e.g., closed; open) of the NP 10 of each of the feeders 8, the status 82 (e.g., inactive; active; trouble) of the thermal sensor 40 of each of the feeders 8, and the status 84 (e.g., inactive; active) of the sudden pressure relay 43 of the NT 12 of each of the feeders 8. The home/status screen 60 also includes an indicator 86 for system protection enabled, and a button 88 for a menu (not shown). Pressing the menu button 88 replaces the statuses 82,84 with a set of buttons (not shown) to request one of the maintenance, sensor reset, protection, and sensor configuration/test screens 62,64,66, 68, a system configuration screen (not shown), and the home/status screen 60.

The maintenance screen 62 of FIG. 2B includes a portion of the home/status screen 60 of FIG. 2A, but replaces the statuses 72,74,82,84 with buttons 92,94,96,98,100 for controlling the MVI 14 and the NP 10 of the various feeders 8. The buttons 92,94,96 respectively trip, reset and close the corresponding MVI 14. The buttons 98,100 respectively lockopen and clear (lockopen) the corresponding NP 10. The network protector relay (shown as MPCV relay) controls closing when the close conditions are satisfied. The lockopen prevents closing; clearing lockopen allows closing.

The sensor reset screen 64 of FIG. 2C includes all of the home/status screen 60 of FIG. 2A, but also includes sensor reset buttons 102,104,106,108. The buttons 102,104 reset the respective CFD sensor 24 and the ground fault sensor 28, as will be described, below. The buttons 106,108 reset respectively the thermal sensor 40 and the sudden pressure relay 43 of the NP 10 and the NT 12 of the various feeders 8.

Figure 2D:
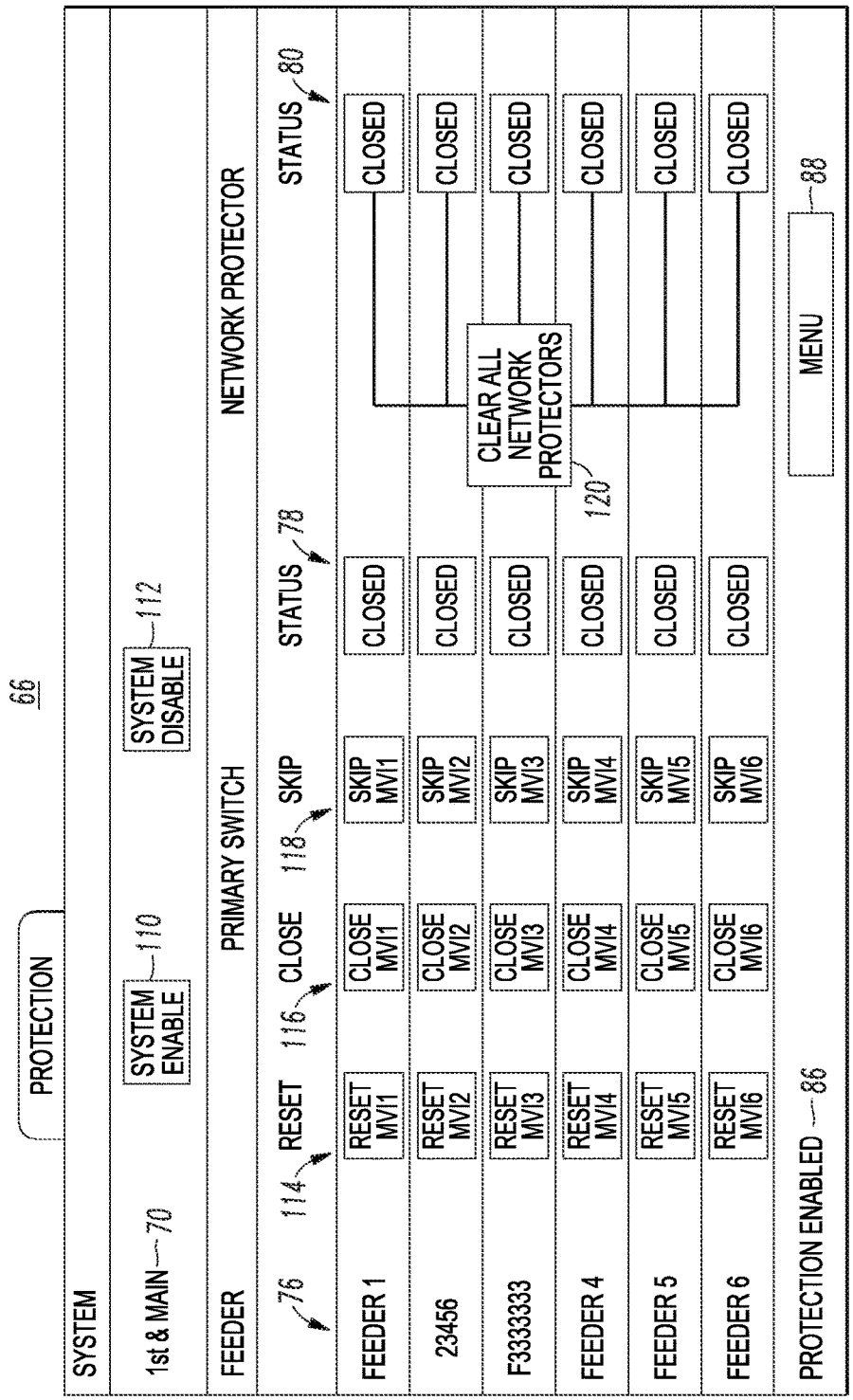

The protection screen 66 of FIG. 2D includes some of the maintenance screen 62 of FIG. 2B, but also includes buttons 110,112 to respectively enable or disable the system 2. Also, the protection screen 66 does not include the buttons 92,94, 96,98,100, but includes buttons 114,116,118 to respectively reset, close and skip (leave open) the MVI 14 of the various feeders 8, and includes a button 120 to clear the NP 10 of all of the various feeders 8.

The sensor configuration/test screen 68 of FIG. 2E includes all of the home/status screen 60 of FIG. 2A, but also includes enable/disable buttons 122,124,126,128. The enable/disable buttons 122 and 124 enable or disable the respective CFD sensor 24 and ground fault sensor 28. The buttons 126,128 enable or disable respectively the thermal sensor 40 and the sudden pressure relay 43 of the NP 10 and NT 12 of the various feeders 8.

The system configuration screen (not shown) includes some of the home/status screen 60, and also enables operator entry of the name(s) the various feeder(s) 8 and, also, indicates a count (e.g., up to six or more) of the feeder(s) 8.

Figure 3A:
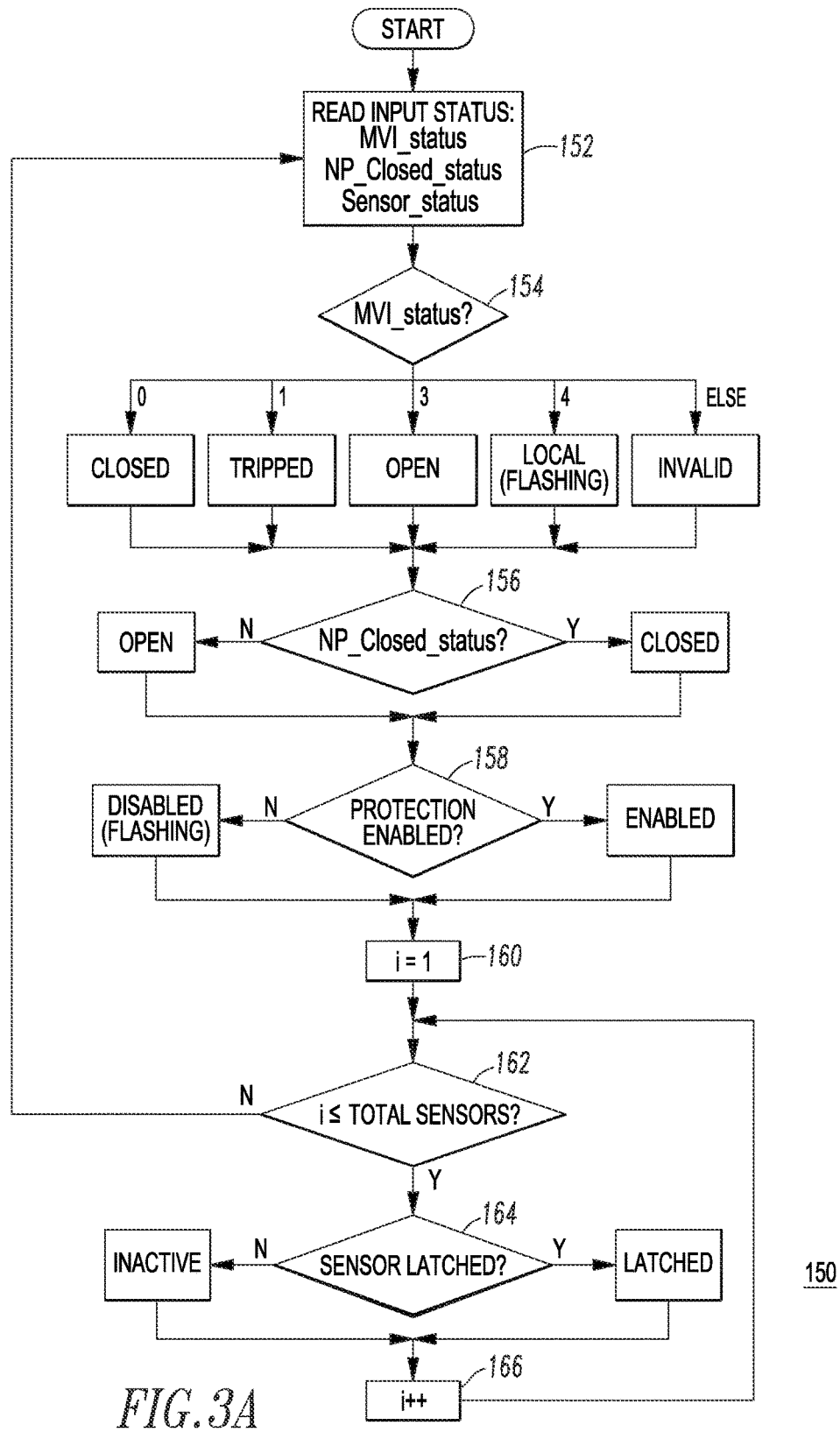

FIG. 3A shows a routine 150 executed by the HMI 30 for the home/status screen 60 of FIG. 2A. First, at 152, various input status is read for the MVI 14, the NP 10 and the sensors 24,28,40,43 of the various feeders 8. Next, at 154, the MVI status is determined to be valid or invalid, and if valid, is displayed as the proper state (e.g., closed, tripped, open or local). In the example embodiment, the local state is displayed with the indicator flashing to emphasize that control is only available locally at the corresponding MVI 14. Then, at 156, the NP closed status is displayed as being either open or closed. Next, at 158, the protection enabled status is displayed as being either disabled (flashing) or enabled.

Next, at 160, a counter for the various sensors is initialized to one. If the counter is less than or equal to the total count of sensors, at 162, then execution proceeds at 164. Otherwise, step 152 is repeated. At 164, it is determined if the corresponding sensor is latched or inactive and the corresponding status is displayed. Finally, at 166, the counter is incremented after which step 162 is repeated.

FIGS. 3B1-3B2 show a routine 170 executed by the HMI 30 for the maintenance screen 62 of FIG. 2B. Since the maintenance screen 62 of FIG. 2B includes a portion of the home/status screen 60 of FIG. 2A, the routine 170 includes a portion of the routine 150 of FIG. 3A. For simplicity of disclosure, that portion is not repeated below. First, at 152', various input status is read for the MVI 14 and the NP 10. Then, after 154, 156 and 158, which have been described, above, steps 172 and 174 respectively check if any of the trip MVI buttons 92 is pressed and then set a bit of a corresponding bitwise logical MVI_Open_ui to indicate the corresponding MVI 14 to be tripped open. Steps 176 and 178 respectively check if any of the reset MVI buttons 94 is pressed and then set a bit of a corresponding bitwise logical MVI_Reset_ui to indicate the corresponding MVI 14 to be reset. Steps 180 and 182 respectively check if any of the close MVI buttons 96 is pressed and then set a bit of a corresponding bitwise logical MVI_Close_ui to indicate the corresponding MVI 14 to be closed. Steps 184 and 186 respectively check if any of the lockopen NP buttons 98 is pressed and then set a bit of a corresponding bitwise logical NP_Blk_Open_ui to indicate the corresponding NP 10 to be locked open. Finally, steps 188 and 190 respectively check if any of the clear NP buttons 100 is pressed and then set a bit of a corresponding bitwise logical NP_Blk_Open_ui to indicate the corresponding NP 10 to be cleared (from being locked open). After step 190 or after step 188 if the test is false, step 152' is repeated.

Figure 3C:
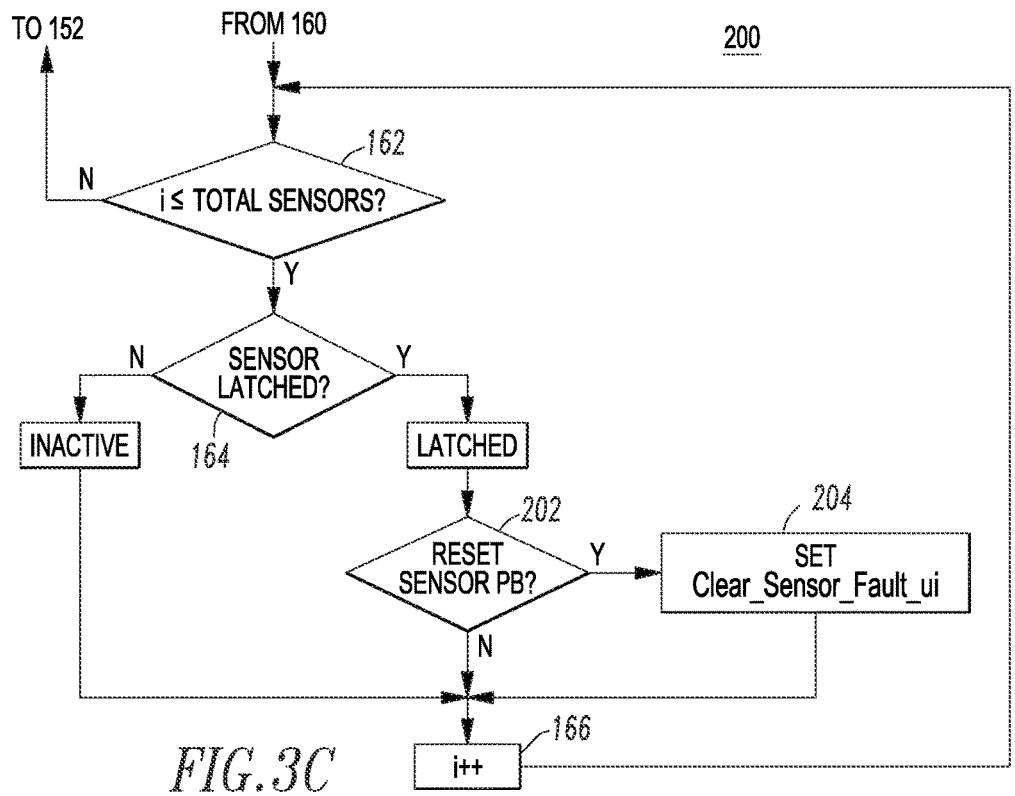

FIG. 3C shows a portion of a routine 200 executed by the HMI 30 for the sensor reset screen 64 of FIG. 2C. Since the sensor reset screen 64 of FIG. 2C includes the home/status screen 60, the routine 200 includes the routine 150 of FIG. 3A. For simplicity of disclosure, that portion is substantially not shown and is not repeated below. In FIG. 3C, after 162 of FIG. 3A, if a sensor is determined to be latched at 164, then, at 202, it is determined if the corresponding sensor reset button 102,104,106,108 is pressed at 202. If not, then step 166 of FIG. 3A is executed. Otherwise, if the corresponding sensor reset button 102,104,106,108 was pressed, then, at 204, a bit of a corresponding bitwise logical Clear_Sensor_Fault_ui is set to indicate the corresponding sensor fault is to be cleared (from being latched). After step 204 or after step 202 if the test was false, step 166 is executed.

FIGS. 3D1-3D2 show a routine 220 executed by the HMI 30 for the protection screen 66 of FIG. 2D. Since the protection screen 66 of FIG. 2D includes a portion of the maintenance screen 62 of FIG. 2B, the routine 220 includes a portion of the routine 170 of FIGS. 3B1-3B2. For simplicity of disclosure, that portion is not repeated below. After step 158 determines whether protection is enable or disabled, steps 222 and 224 respectively check if any of the reset MVI buttons 114 is pressed and then set a bit of a corresponding bitwise logical MVI_Reset_ui to indicate the corresponding MVI 14 to be reset. Then, steps 226 and 228 respectively check if any of the close MVI buttons 116 is pressed and then set a bit of a corresponding bitwise logical MVI_Close_ui to indicate the corresponding MVI 14 to be closed. Next, steps 230 and 232 respectively check if any of the skip MVI buttons 118 is pressed and then set a bit of a corresponding bitwise logical MVI_Skip_ui to indicate the corresponding MVI 14 to be skipped (left open).

Next, at 234, it is determined if the MVI 14 of all of the feeders 8 is to be closed or to be skipped (left open). Here, "Closed|Skip" means a bitwise (e.g., operating on one or more bit patterns or binary numerals at the level of their individual bits) OR of the bits of the variables set at 228 and 232. If not, then step 152' is repeated. Otherwise, steps 236 and 238 respectively check if the clear (all of the) NPs button 120 is pressed and then all of the bits of a corresponding bitwise logical NP_Clear_BlkOpen_ui to indicate that the NP 10 of all of the feeders 8 is to be cleared of the block open state. After 238, or if the test at 236 was false, then step 152' is repeated.

Figure 3E:
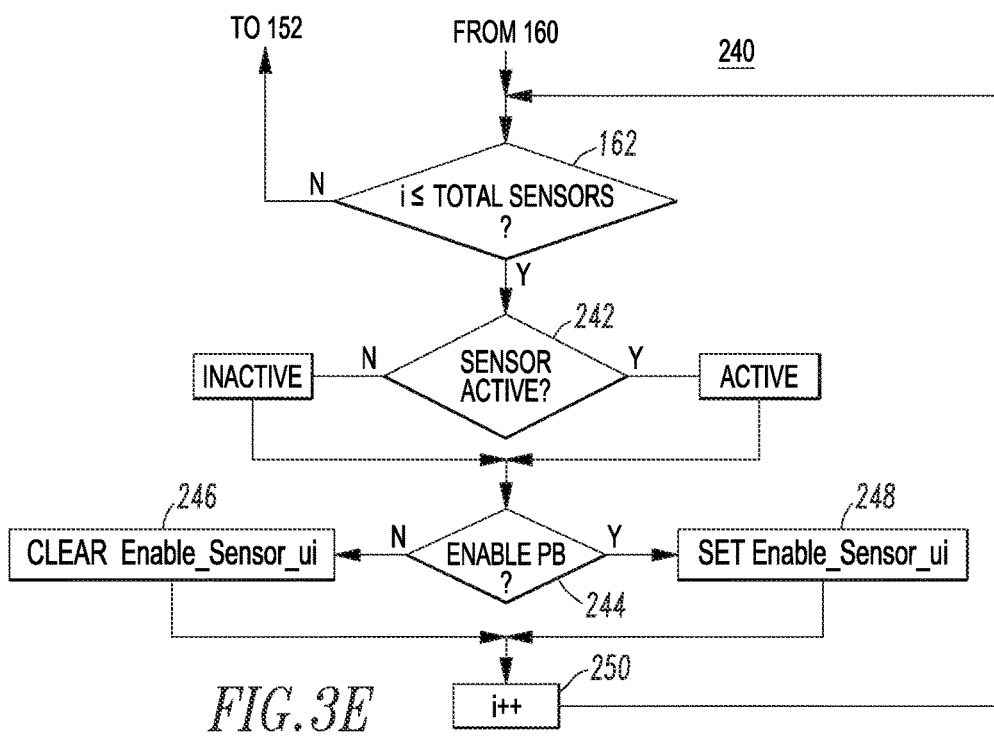

FIG. 3E shows a routine 240 executed by the HMI 30 for the sensor configuration/test screen 68 of FIG. 2E. This screen 68 permits testing of each sensor individually without causing operation of the corresponding MVI 14 or NP 10. Since the sensor configuration/test screen 68 of FIG. 2E includes a portion of the home/status screen 60, the routine 240 includes a portion of the routine 150 of FIG. 3A. For simplicity of disclosure, that portion is substantially not shown and is not repeated below. In FIG. 3E, after 162 at 242, a sensor is determined to be active or inactive. Next, at 244, it is determined if the corresponding enable button 122,124,126,128 is depressed. If not, then a bit of a corresponding bitwise logical Enable_Sensor_ui is cleared to indicate the corresponding sensor to be cleared. On the other hand, if corresponding enable button 122,124,126,128 is depressed at 244, then a bit of the same bitwise logical is set to indicate the corresponding sensor to be enabled. After 246 or 248, the counter of step 160 (FIG. 3A) is incremented at 250 and step 162 is repeated.

Figure 4:
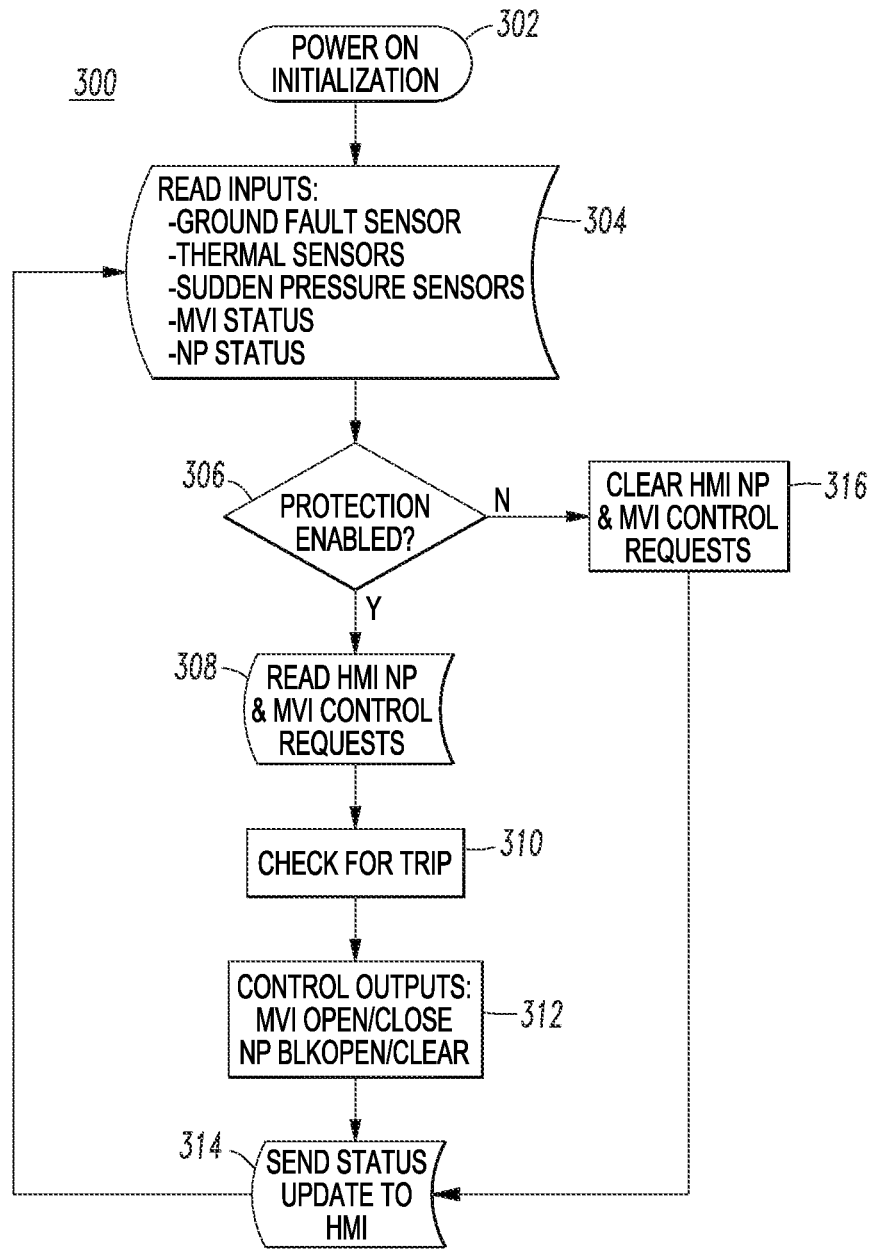
FIG. 4 is a top level flowchart of a routine executed by the controller of FIG. 1.

FIG. 4 shows a routine 300 executed by a processor 402 (FIG. 6) of the RTU 16 of FIG. 1. After power on initialization at 302, the routine 300 reads inputs, at 304, from the ground fault sensor 28, and from the thermal sensor 40, the sudden pressure relay 43, the status of the MVI 14, and the status of the NP 10 from the various feeders 8. Next, at 306, it is determined if protection is enabled (e.g., as displayed at indicator 86 of FIGS. 2A-2E, or as enabled by button 110 of FIG. 2D). If so, then at 308, various HMI NP and MVI control requests are read as determined at even steps 172-190 of FIG. 3B2 or at even steps 222-238 of FIG. 3D2. Next, at 310, a check for trip routine 311 (FIG. 5B) is executed. Then, at 312, a control outputs routine 313 (FIGS. 5C1-5C2) is executed. This routine 313 opens or closes the MVI 14 and blockopens or clears the NP 10 of the various feeders 8. Next, at 314, a status update is sent to the HMI 30 after which step 304 is repeated. On the other hand, if protection was not enabled at 306, then, at 316, the various HMI NP and MVI control requests are cleared before step 314 is executed.

Referring to FIGS. 5A1-5A2, a read inputs routine 320 is shown. This corresponds to step 304 of FIG. 4. After starting at 321, at 322, it is determined if a ground fault was detected by the ground fault sensor 28 and the logical Gnd_fault_status is either set or cleared, as appropriate. Then, at 324, it is determined if the CFD sensor 24 is active and the logical Thermal_fault_status.0 is either set or cleared, as appropriate. In this logical, the ".0" refers to the status from the system CFD sensor 24 as opposed to being from the NP thermal sensor 40 of any of the various feeders 8. Next, at 326, it is determined if the CFD sensor 24 reports trouble being active and the logical Alarm_status.0 is either set or cleared, as appropriate. Again, in this logical, the ".0" refers to the status from the system CFD sensor 24 as opposed to being from the NP thermal sensor 40 of any of the various feeders 8.

Then, at 328, an index n is initialized to 1 to correspond to the sensors or status of the various feeders 8. Next, at 330, it is determined if the thermal sensor 40 of the NP indexed by "n" is active and the logical Thermal_fault_status.n is either set or cleared, as appropriate. In this logical, the ".n" refers to the status from the NP indexed by "n" as opposed to the system CFD sensor 24. Then, at 332, it is determined if the sudden pressure relay 43 of the NT 12 indexed by "n" is active and the logical SP_fault_status.n is either set or cleared, as appropriate. In this logical, the ".n" refers to the status from the NT 12 indexed by "n". Next, at 334, it is determined if the NP 10 indexed by "n" is closed and the logical NP_closed_status.n is either set or cleared, as appropriate. In this logical, the ".n" refers to the closed status from the NP 10 indexed by "n".

Then, at 336, the status of the MVI 14 indexed by "n" is read from the MVI "Aux1", "Aux2" and "Aux3" signals 44,46,48. In particular, the logical Alarm_status.n is set equal to "Aux3" which is true when the MVI 14 indexed by "n" is in a local control mode, which is alarmed. Also, the logicals MVI_n_status.2, MVI_n_status.1 and MVI_n_status.0 are respectively set to the values of the "Aux3", "Aux1" and "Aux2" signals 48,44,46.

Next, at 338, the index "n" is incremented and is determined if the incremented index is less than or equal to the total number of feeders 8 (Num_units). If so, then step 330 is repeated. Otherwise, at 340, the various enable/clear inputs are read from the HMI 30. The logical Enable_System_ui corresponds to the displayed protection enabled indicator 86 of FIGS. 2A-2E. The bitwise logicals Enable_Gnd_ui, Enable_Thermal_ui and Enable_SP_ui correspond to the bitwise logical Enable_Sensor_ui set on a bitwise basis at 248 of FIG. 3E or cleared on a bitwise basis at 246 of FIG. 3E. Also, the bitwise logicals Clear_Gnd_ui, Clear_Thermal_ui and Clear_SP_ui correspond to the bitwise logical Clear_Sensor_Fault_ui set on a bitwise basis at 204 of FIG. 3C.

Then, at 342, it is determined if the logical Enable_System_ui is false or true. If true, then, at 344, various control inputs are read from the HMI 30. These include the bitwise logical NP_Blk_Open_ui from steps 186 and 190 of FIG. 3B2, the bitwise logical NP_Clear_BlkOpen_ui from step 238 of FIG. 3D2, and the bitwise logicals MVI_Open_ui, MVI_Reset_ui and MVI_Close_ui from respective steps 174, 178 and 182 of FIG. 3B2 and steps 224 and 228 of FIG. 3D2. Next, the check for trip routine 311 (FIG. 5B) is executed.

On the other hand, if the logical Enable_System_ui is false at 342, then, at 346, the control inputs are cleared and are sent to the HMI 30 including the bitwise logical NP_BlkOpen_ui=0 and the bitwise logicals MVI_Open_ui=0, MVI_Reset_ui=0 and MVI_Close_ui=0. These controls are cleared here so that they are not still set when protection is re-enabled. Next, step 396 of the control outputs routine 313 (FIGS. 5C1-5C2) is executed.

Figure 5B:
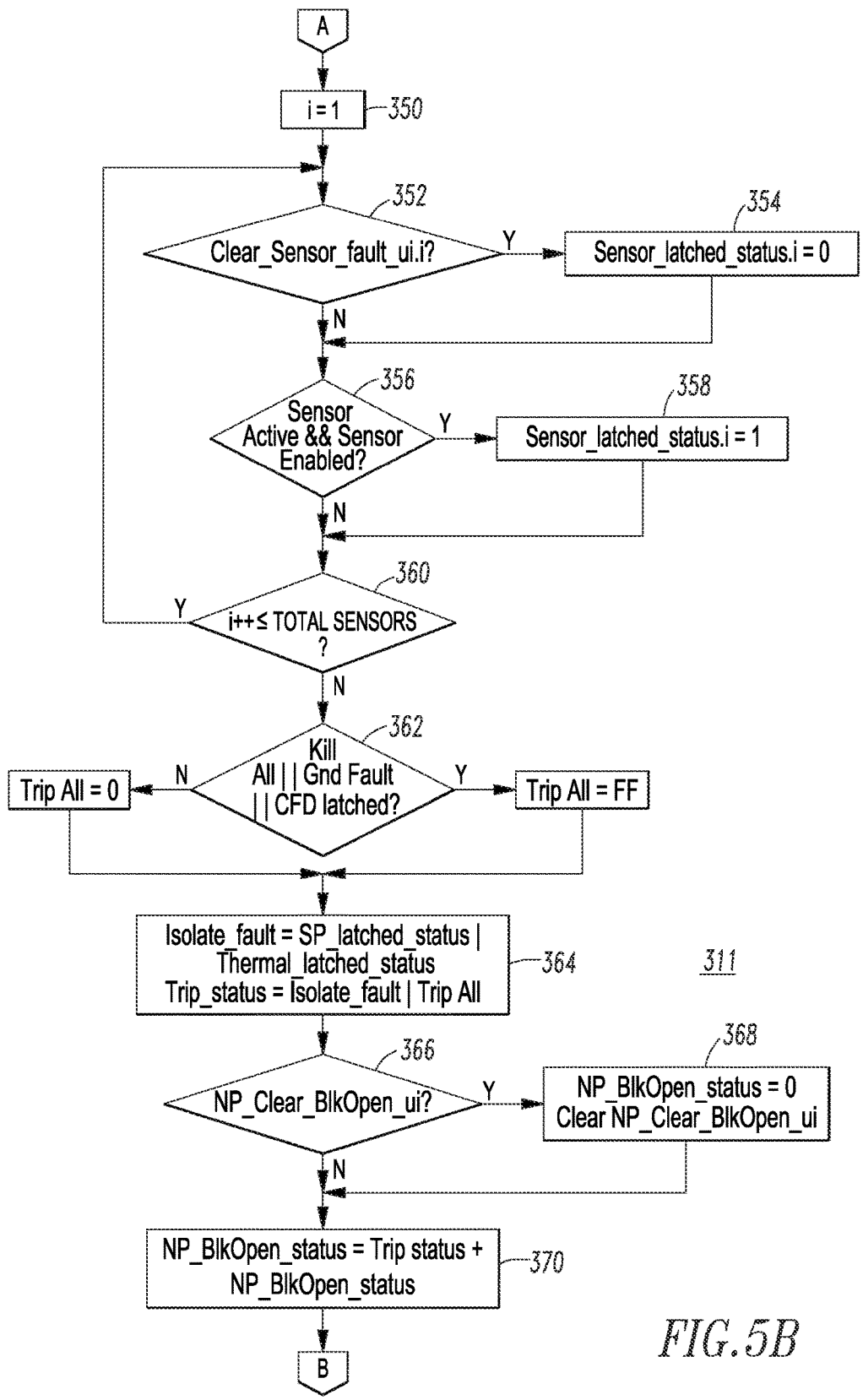

Referring to FIG. 5B, the check for trip routine 311 is shown. First, at 350, which follows after step 344 of FIG. 5A2, an index for the sensors is initialized to one. Then, at 352, it is determined if the bitwise logical Clear_Sensor_fault_ui.i from step 204 of FIG. 3C as indexed by the index "i" from step 350 is true. If so, then the bitwise logical Sensor_latched_status.i as indexed by the index "i" is cleared. Otherwise, or after step 354, at 356, it is determined if a logical AND of Sensor Active (for the corresponding sensor indexed by the index "i" and using the corresponding one of the logical Gnd_fault_status of step 322 of FIG. 5A1, the logical Thermal_fault_status.n of step 330 of FIG. 5A1 or the logical SP_fault_status.n of step 332 of FIG. 5A1) and logical Sensor Enabled (for the corresponding sensor indexed by the index "i" and using the corresponding one of the logicals Enable_Gnd_ui, Enable_Thermal_ui and Enable_SP_ui of step 340 of FIG. 5A2) is true. If so, then the logical Sensor_latched_status.i is set at 358. This is accomplished in the trip routine by doing a bitwise AND/OR of each of the variables for all sensors of the same type. As shown, there is a logical AND of sensor fault active and sensor enabled. After 358, or if the test at 356 failed, at 360, the index of step 350 is incremented and it is determined if the incremented index is less than or equal to the total count of sensors. If not, then execution proceeds at step 362. Otherwise, step 352 is repeated.

At 362, a logical OR of the logical states of the kill all switch 26, the ground fault sensor 28 and the CFD sensor 24 is performed. If true, the bitwise logical Trip All is set to FF, or, if false, the bitwise logical Trip All is cleared to 0. Then, at 364, a bitwise logical Isolate_fault is set from a bitwise OR of the bitwise logicals SP_latched_status (step 358), and Thermal_latched_status (step 358), and a bitwise logical Trip_status is set from a bitwise OR of the bitwise logicals Isolate_fault (step 364) and Trip All (step 362).

Next, step 366 determines if any of the bits of the bitwise logical NP_Clear_BlkOpen_ui from step 238 of FIG. 3D2 is true. If so, then the logical NP_BlkOpen_status is set to zero and the logical NP_Clear_BlkOpen_ui is cleared. After 368, or if step 366 was not true, then the logical NP_BlkOpen_status is set to the logical OR of NP_BlkOpen_status and Trip_status (step 364). After 370, execution resumes at step 372 of FIG. 5C1.

FIGS. 5C1-5C2 show the control outputs routine 313. First, at 372, the bitwise logical Operate_MVI is set to the bitwise logical OR of Trip_status (step 364 of FIG. 5B) and MVI_Open_ui (step 344 of FIG. 5A2), and the bitwise logical Operate_NP is set to the bitwise logical OR of NP_BlkOpen status (step 368 of FIG. 5B) and NP_BlkOpen_ui (step 344 of FIG. 5A2). Next, at 374, an index "n" for the feeders 8 is set to 1. Then, at 376, the MVI status for feeder "n" is determined (e.g., closed; tripped; open; something else) from the values of step 336 of FIG. 5A2 as indexed by "n".

Each of even steps 378-388 uses the index "n" as part of the following logic. For the closed status (0) at 378, if the bitwise logical Operate_MVI.n (step 372) is true, then the output Open MVI.n is pulsed at 380 to open the corresponding MVI 14 for feeder "n". After 380, or if the test at 378 was false, then execution resumes at 388. For the tripped status (1) at 382, if the bitwise logical MVI_Reset_ui.n (step 224 of FIG. 3D2) is true, then the output Open MVI.n is pulsed at 380 to open the corresponding MVI 14 for feeder "n". Otherwise, if the test at 382 was false, then execution resumes at 388. For the open status (3) at 384, if the bitwise logical MVI_Close_ui.n (step 228 of FIG. 3D2) is true and the bitwise logical Trip_status.n is not (as shown by the operator "!") true, then the output Close MVI.n is pulsed at 386 to close the corresponding MVI 14 for feeder "n". Otherwise, if the test at 384 was false, or if the MVI status was other than closed, tripped or open (e.g., local), then execution resumes at 388. At 388, if the bitwise logical Operator_NP (step 372) (again indexed by the bit index "n") is true, then the output Open NP.n is set, otherwise, that output is cleared.

Next, at 390, the index "n" is incremented and it is determined if the incremented index is less than or equal to the count of feeders 8 (Num_units). If so, then execution resumes at 376 for the next feeder 8. On the other hand, if all of the feeders 8 have been controlled, then at 392, it is determined if the logical OR of the logical Trip_status (step 364 of FIG. 5B) and the logical Alarm_status (steps 326 and 336 of FIG. 5A2) is true. If so, then the output Alarm is set. Otherwise, the output Alarm is cleared.

Next, at 394, the following control inputs are cleared and sent to the HMI 30: MVI_Open_ui, MVI_Reset_ui, MVI_Close_ui, Clear_Gnd_Fault_ui, Clear_SP_Fault_ui and Clear_Thermal_Fault_ui.

Finally, at 396, the following status updates are sent to the HMI 30: Alarm_status, Trip_status, MVI_status, NP_Closed_status, NP_BlkOpen_status, Gnd_fault_status_ui, SP_fault_status_ui, Thermal_fault_status_ui, Gnd_latched_status_ui, SP_latched_status_ui and Thermal_latched_status_ui.

Figure 6:
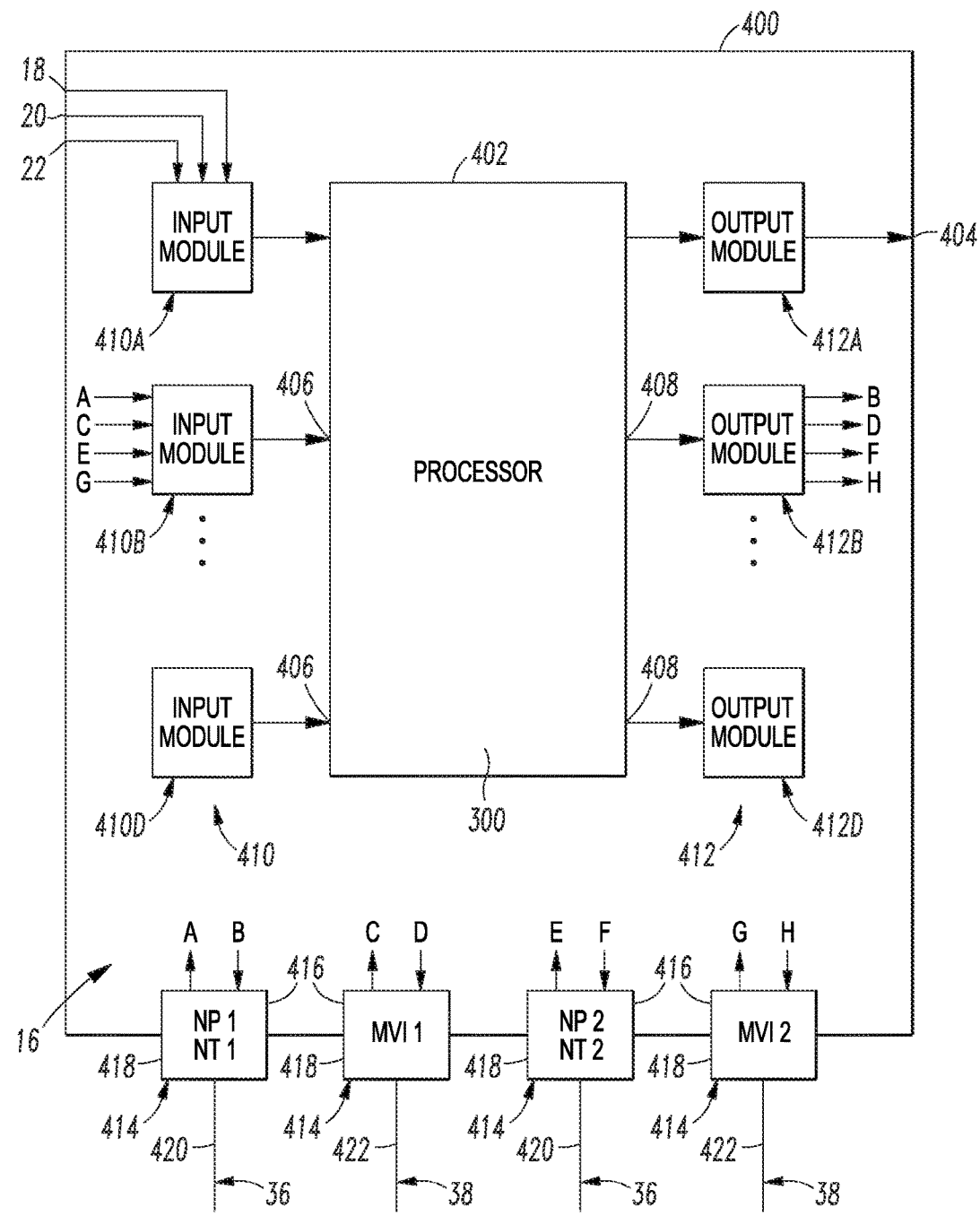
FIG. 6 is a block diagram of the controller of FIG. 1.

Referring to FIG. 6, the RTU 16 includes an enclosure 400 and a processor 402 within the enclosure 400. The processor 402 includes the routine 300 (FIG. 4), the number of inputs 18,20,22 to the processor 402, a number of outputs 404 from the processor 402, and a plurality of inputs 406 to and a plurality of outputs 408 from the processor 402 for each of the feeders 8 (FIG. 1).

The RTU 16 further includes a plurality of input modules 410 interfaced to the processor 402 within the enclosure 400 for the plurality of inputs 406, and a plurality of output modules 412 interfaced to the processor 402 within the enclosure 400 for the plurality of outputs 408. A first input module 410A interfaces the number of inputs 18,20,22 from the number of network vaults 4 (FIG. 1). A first output module 412A interfaces the number of outputs 404 to the number of network vaults 4. A different second input module 410B and a different second output module 412B interface some of the plurality of inputs 406 and some of the plurality of outputs 408 for two of the feeders 8. Two other input and output modules 410D and 412D, respectively, are shown. The example system 2 with six example feeders 8 includes four input modules 410 (only three are shown) and four output modules 412 (only three are shown).

The enclosure 400 includes a plurality of connectors 414 each of which has a first portion 416 internal to the enclosure 400 and a second portion 418 external to the enclosure 400. Each of the connectors 414 is for the NP 10 (FIG. 1) or the MVI 14 (FIG. 1) of a corresponding one of the feeders 8 (FIG. 1). The connector first portion 416 is electrically interconnected to a corresponding one of the output modules 412B and to a corresponding one of the input modules 410B within the enclosure 400. The second portion 418 of each of the connectors 414 includes the corresponding cables 36 or 38 for electrical connection to the NP 10 or the MVI 14 of the corresponding one of the feeders 8. The cable 36 for electrical connection to the NP 10 includes a plurality of conductors 420 for the status 39 from the NP 10, a signal from the thermal sensor 40 of the NP 10, a signal from the sudden pressure relay 43 of the NT 12, and the command 41 to the NP 10. The cable 38 for electrical connection to the MVI 14 includes a plurality of conductors 422 for receiving the status 44,46,48 from the MVI 14, and sending the commands 50,52 to the MVI 14.

The wiring from the various sensors 40,43, the MVI 14 and the NP 10 to the RTU 16 is via two wiring harnesses, such as the example cables 36,38 (FIG. 1) that connect to the pre-wired controller enclosure 400 (FIG. 6) (e.g., without limitation, using water tight connectors 414). This eliminates multiple sources of wiring errors and speeds installation.

The disclosed thermal event system enclosure 400 includes factory wiring (or pre-wiring) from the example RTU processor 402 to the external connectors 414 for a plurality (e.g., without limitation, six; any suitable count) of the feeders 8, which include the NP 10, the NT 12 and the MVI 14. As a result, the customer or system installer need only connect pre-terminated cables 36,38 between the pre-wired enclosure 400 and the MVI 14, and between the pre-wired enclosure 400 and the NP 10 for each of the feeders 8, and provide any additional wiring for general inputs 18,20,22 and outputs 404 of the system not directly related to the NP 10, the NT 12 and the MVI 14 of the various feeders 8. This significantly reduces the number of customer connection points, saves cost and minimizes error. Furthermore, once connected, every connection point is easily tested from the HMIs 30 and/or 34.

The disclosed thermal event system 2 provides a significant improvement over known prior systems. The HMIs 30 and/or 34 of the system 2 significantly reduce installation and maintenance cost and complexity by replacing all the wiring to discrete lights and switches with a single communication cable.

Although thermal and sudden pressure sensors have been disclosed, it will be appreciated that one or both of such sensors can be replaced by one or more of the following types of sensors in connection with thermal event control and monitoring: acoustic sensors, voltage sensors, current sensors, gas sensors, light sensors, and arc flash sensors.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An autonomous thermal event control and monitoring system for a number of network vaults including a first medium voltage feeder and a second medium voltage feeder of a network bus, the first medium voltage feeder including: a first network protector having a first thermal sensor outputting a first thermal sensor signal, the first network protector having a first network protector status and inputting a first network protector command, a first network transformer having a first sudden pressure sensor outputting a first sudden pressure signal, and a first medium voltage interrupter outputting a first medium voltage interrupter status and inputting a first medium voltage interrupter command, the second medium voltage feeder including: a second network protector having a second thermal sensor outputting a first thermal sensor signal, the second network protector outputting a second network protector status and inputting a second network protector command, a second network transformer having a second sudden pressure sensor outputting a first sudden pressure signal, and a second medium voltage interrupter outputting a second medium voltage interrupter status and inputting a second medium voltage interrupter command, said system comprising:

a processor component comprising an enclosure, a processor within the enclosure, the processor including a routine, the processor having a first network protector status input, a second network protector status input, a first thermal sensor input, a second thermal sensor input, a first sudden pressure sensor input, a second sudden pressure sensor input, a first medium voltage interrupter status input, a second medium voltage interrupter status input, a first network protector command output, a second network protector command output, a first medium voltage interrupter command output and a second medium voltage interrupter command output; and a human machine interface communicating with said processor, wherein said processor component further comprises an input module associated with the first medium voltage feeder and the second medium voltage feeder, the input module being connected to the first network protector status input, the second network protector status input, the first thermal sensor input, the second thermal sensor input, the first sudden pressure sensor input, the second pressure sensor input, the first medium voltage interrupter status input, and the second medium voltage interrupter status input, and an output module associated with the first medium voltage feeder and the second medium voltage feeder, the output module being connected to the first network protector command output, the second network protector command output, the first medium voltage interrupter command output and the second medium voltage interrupter command output, and wherein said enclosure includes a first connector corresponding to the first network protector and the first network transformer, a second connector corresponding to the first medium voltage interrupter, a third connector corresponding to the second network protector and the second network transformer, and the fourth connector corresponding to the second medium voltage interrupter, each of said first, second, third and fourth connectors having a first portion internal to said enclosure and a second portion external to said enclosure, wherein the second portion of the first connector receives first cables connected to the first network protector and the first network transformer, the second portion of the second connector receives second cables connected to the first medium voltage interrupter, the second portion of the third connector receives third cables connected to the second network protector and the second network transformer, and the second portion of the fourth connector receives fourth cables connected to the second medium voltage interrupter, and wherein the first portion of the first connector, the first portion of the second connector, the first portion of the third connector and the first portion of fourth connector are connected to the input module and the output module in a manner such that the first and second thermal sensor signals, the first and second network protector statuses, the first and second sudden pressure signals and the first and second medium voltage interrupter statuses are provided to the processor through the input module, and the first network protector command is provided to the first network protector, the second network protector command is provided to the second network protector, the first medium voltage interrupter command is provided to the first medium voltage interrupter and the first medium voltage interrupter command is provided to the first medium voltage interrupter through the output module.

2. The system of claim 1 wherein the human machine interface is electrically connected to said processor by a single communication cable.

3. The system of claim 1 wherein for said first medium voltage feeder, the routine of said processor is structured to trip open said first medium voltage interrupter and open said first network protector responsive to the first thermal sensor of said first network protector being active or the first sudden pressure sensor of said first network transformer being active, and wherein for said second medium voltage feeder, the routine of said processor is structured to trip open said second medium voltage interrupter and open said second network protector responsive to the second thermal sensor of said second network protector being active or the second sudden pressure sensor of said second network transformer being active.

4. The system of claim 1 wherein said system is a thermal event system further comprising four additional feeders.

5. The system of claim 1 further comprising a number of inputs to the processor selected from the group consisting of an input for a continuous fire detection probe, an input for a kill switch and an input for a number of ground fault sensors.

6. The system of claim 5, wherein the routine of said processor is structured to trip open said first and second medium voltage interrupters, and open said first and second network protectors, responsive to any of said number of inputs being active.

7. The system of claim 1 wherein said human machine interface includes a wired or wireless communication interface configured for communication with said processor.

8. the system of claim 1 wherein said processor component further comprises a serial port configured to communicate with a communications device.

9. The system of claim 8 wherein said communications device communicates using a first communication network to said first and second network protectors, and a second communication network to the serial port of said processor component; and wherein said communications device includes a port for communicating status, alarms, and e-mail alerts for said first and second network protectors to said human machine interface.

10. The system of claim 1 further comprising a number of outputs from said processor selected from the group consisting of a system alarm, a system disabled alarm, a trip alarm, a continuous fire detection probe trouble alarm, and a local alarm of said first and second medium voltage interrupters.

11. The system of claim 1, wherein said first network protector includes a first circuit breaker, wherein the status of said first network protector is an open-close status of said first circuit breaker, and wherein the command to said first network protector is a trip-lockout command, and wherein said second network protector includes a second circuit breaker, wherein the status of said second network protector is an open-close status of said second circuit breaker, and wherein the command to said second network protector is a trip-lockout command.

12. The system of claim 1 wherein the statuses of said first medium voltage interrupter are a plurality of auxiliary signals defining a plurality of closed, tripped, open and local control states thereof; and wherein the commands to said first medium voltage interrupter are trip and close commands, and wherein the statuses of said second medium voltage interrupter are a plurality of auxiliary signals defining a plurality of closed, tripped, open and local control states thereof, and wherein the commands to said second medium voltage interrupter are trip and close commands.

13. The system of claim 1, wherein said human machine interface and said processor are structured to cooperate to latch operation of the first and second thermal sensors, and the first and second sudden pressure sensors until a corresponding reset command is input by said human machine interface to unlatch said latch operation.

14. The system of claim 13 wherein the routine of said processor is further structured to prevent reclosing of said first and second medium voltage interrupters and block open said first and second network protectors until said latch operation is unlatched.

15. The system of claim 1, wherein said human machine interface and said processor are structured to cooperate to enable or disable operation of the first and second thermal sensors or the first and second sudden pressure sensors.

\* \* \* \* \*